(12) United States Patent
Reddy et al.

(10) Patent No.: US 11,087,651 B2
(45) Date of Patent: *Aug. 10, 2021

(54) UNDERWATER IMAGE PROJECTION DISPLAY SYSTEM, LIGHTING CONTROL SYSTEM AND DEVICE AND METHOD OF OPERATING SAME

(71) Applicant: Pentair Water Pool and Spa, Inc., Cary, NC (US)

(72) Inventors: Rakesh Reddy, Deerfield Beach, FL (US); Bruce Johnson, Deerfield Beach, FL (US); Kevin Doyle, Deerfield Beach, FL (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/484,874

(22) Filed: Apr. 11, 2017

(65) Prior Publication Data

US 2017/0221397 A1    Aug. 3, 2017

Related U.S. Application Data

(63) Continuation of application No. 13/769,813, filed on Feb. 18, 2013, now Pat. No. 9,620,080, which is a
(Continued)

(51) Int. Cl.
*G09G 3/00* (2006.01)
*G03B 21/14* (2006.01)
(Continued)

(52) U.S. Cl.
CPC .............. *G09G 3/001* (2013.01); *E04H 3/14* (2013.01); *E04H 4/148* (2013.01); *G02B 23/22* (2013.01);
(Continued)

(58) Field of Classification Search
CPC ........ G09G 3/001; H04N 9/31; H04N 9/3102; H04N 9/3161; H04N 9/3135;
(Continued)

(56) References Cited

U.S. PATENT DOCUMENTS

| 4,196,461 A | 4/1980 | Geary |
| 4,661,893 A * | 4/1987 | Robinson ................. F21S 8/00 362/101 |

(Continued)

FOREIGN PATENT DOCUMENTS

| CN | 201180381 Y | 1/2009 |
| DE | 102009059689 A1 | 6/2011 |

(Continued)

OTHER PUBLICATIONS

ILDA International Laser Display Association New products and services from ILDA Members; product literature; Oct. 2006; 9 pages; retrieved from U.S. Patent Office; U.S. Pat. No. 9,620,080.

*Primary Examiner* — Priyank J Shah
(74) *Attorney, Agent, or Firm* — Husch Blackwell LLP

(57) ABSTRACT

An underwater image projection system submerged in a body of water and projecting an image within the body of water. The system includes a submerged projection element, a light source steering device, a user interface, and a controller. The submerged projecting element includes a projecting light source that projects an image within the body of water. The light source steering device directs light from the projecting light source. The user interface receives data input from a user including at least one of an input of the image and instructions for displaying the image. The controller retrieves the data input from the user interface, accesses image data corresponding to the image, and controls the projecting light source and the light source steering device to project the image onto a target surface within the
(Continued)

body of water based on the data input from the user interface.

20 Claims, 22 Drawing Sheets

Related U.S. Application Data continuation-in-part of application No. 13/533,966, filed on Jun. 26, 2012.

(60) Provisional application No. 61/600,639, filed on Feb. 18, 2012.

(51) Int. Cl.

| | |
|---|---|
| E04H 3/14 | (2006.01) |
| G02B 23/22 | (2006.01) |
| G03B 21/00 | (2006.01) |
| H04N 9/31 | (2006.01) |
| E04H 4/14 | (2006.01) |
| G09G 5/10 | (2006.01) |
| G03B 21/20 | (2006.01) |
| G03B 21/606 | (2014.01) |

(52) U.S. Cl.
CPC .............. *G03B 21/00* (2013.01); *G03B 21/14* (2013.01); *G03B 21/145* (2013.01); *G03B 21/147* (2013.01); *G03B 21/2046* (2013.01); *G09G 5/10* (2013.01); *H04N 9/31* (2013.01); *H04N 9/3161* (2013.01); *H04N 9/3194* (2013.01); *G03B 21/606* (2013.01); *G09G 2354/00* (2013.01)

(58) Field of Classification Search
CPC .... H04N 9/3185; G03B 21/14; G03B 21/142; G03B 21/145; G03B 21/147; G03B 21/16; G03B 21/26
See application file for complete search history.

(56) References Cited

U.S. PATENT DOCUMENTS

| | | | |
|---|---|---|---|
| 4,887,197 A | 12/1989 | Effinger | |
| 4,905,326 A * | 3/1990 | Nakamura | E04H 4/00 4/488 |
| 5,576,901 A | 11/1996 | Hanchett | |
| 5,934,796 A | 8/1999 | Quereau | |
| 6,086,215 A | 7/2000 | Giattino et al. | |
| 6,278,373 B1 | 8/2001 | Jaurigue et al. | |
| 6,472,990 B2 | 10/2002 | Delmar | |
| 6,592,228 B1 | 7/2003 | Kawashima et al. | |
| 6,827,464 B2 | 12/2004 | Koren et al. | |
| 6,951,411 B1 | 10/2005 | Kumar et al. | |
| 7,303,301 B2 | 12/2007 | Koren et al. | |
| 7,357,525 B2 | 4/2008 | Doyle | |
| 7,410,268 B2 | 8/2008 | Koren et al. | |
| 7,482,764 B2 | 1/2009 | Morgan et al. | |
| 7,699,515 B2 | 4/2010 | Faber et al. | |
| 7,717,582 B2 * | 5/2010 | Longoria | F21S 9/02 362/101 |
| 7,740,367 B2 | 6/2010 | Koren | |
| 7,744,237 B2 | 6/2010 | Potucek et al. | |
| 7,810,942 B2 | 10/2010 | Kunkel et al. | |
| 8,279,197 B2 | 10/2012 | Murphy et al. | |
| 2004/0027313 A1* | 2/2004 | Pate | G09G 3/2022 345/30 |
| 2005/0035728 A1 | 2/2005 | Schanberger et al. | |
| 2005/0041164 A1* | 2/2005 | Sato | B60R 11/02 348/744 |
| 2005/0146777 A1 | 7/2005 | Russell | |
| 2007/0052930 A1* | 3/2007 | Ki | G03B 21/16 353/57 |
| 2007/0064199 A1* | 3/2007 | Schindler | G03B 21/26 353/30 |
| 2007/0242236 A1 | 10/2007 | Sugiura | |
| 2007/0257181 A1 | 11/2007 | Dittmer et al. | |
| 2009/0121657 A1 | 5/2009 | Erchak et al. | |
| 2010/0019686 A1 | 1/2010 | Gutierrez, Jr. | |
| 2010/0057803 A1 | 3/2010 | Ellis et al. | |
| 2010/0157042 A1* | 6/2010 | Aizaki | H04N 1/465 348/79 |
| 2010/0171937 A1* | 7/2010 | Hirata | G02B 13/16 353/70 |
| 2010/0177283 A1* | 7/2010 | Tanaka | G03B 21/147 353/69 |
| 2010/0201894 A1* | 8/2010 | Nakayama | G09G 3/3433 348/745 |
| 2010/0208211 A1* | 8/2010 | Paulussen | G03B 21/13 353/29 |
| 2010/0250449 A1 | 9/2010 | Doyle et al. | |
| 2010/0302515 A1 | 12/2010 | Plut | |
| 2010/0328625 A1* | 12/2010 | Miyazaki | G02B 26/008 353/85 |
| 2011/0001973 A1* | 1/2011 | Polidor | G01B 9/08 356/393 |
| 2011/0205501 A1* | 8/2011 | Cobb | G02B 27/102 353/81 |
| 2011/0246509 A1 | 10/2011 | Migita et al. | |
| 2012/0044467 A1* | 2/2012 | Nakayama | G03B 21/00 353/85 |
| 2012/0050324 A1* | 3/2012 | Jeong | G06F 17/30 345/633 |
| 2012/0281152 A1* | 11/2012 | Nemeth | G03B 21/60 348/744 |
| 2013/0100037 A1* | 4/2013 | Mabie | G06F 3/04186 345/173 |
| 2013/0215394 A1* | 8/2013 | Reddy | H04N 9/31 353/31 |
| 2014/0078409 A1* | 3/2014 | Wang | G03B 21/54 349/5 |
| 2014/0085613 A1* | 3/2014 | Doyle | H04N 9/3185 353/69 |
| 2015/0193074 A1* | 7/2015 | Cudak | G06F 11/07 345/173 |

FOREIGN PATENT DOCUMENTS

| | | |
|---|---|---|
| EP | 0838696 A1 | 4/1998 |
| JP | 2002006397 A * | 1/2002 |
| JP | 2008216412 A | 9/2008 |
| WO | 2009008710 A1 | 1/2009 |

* cited by examiner

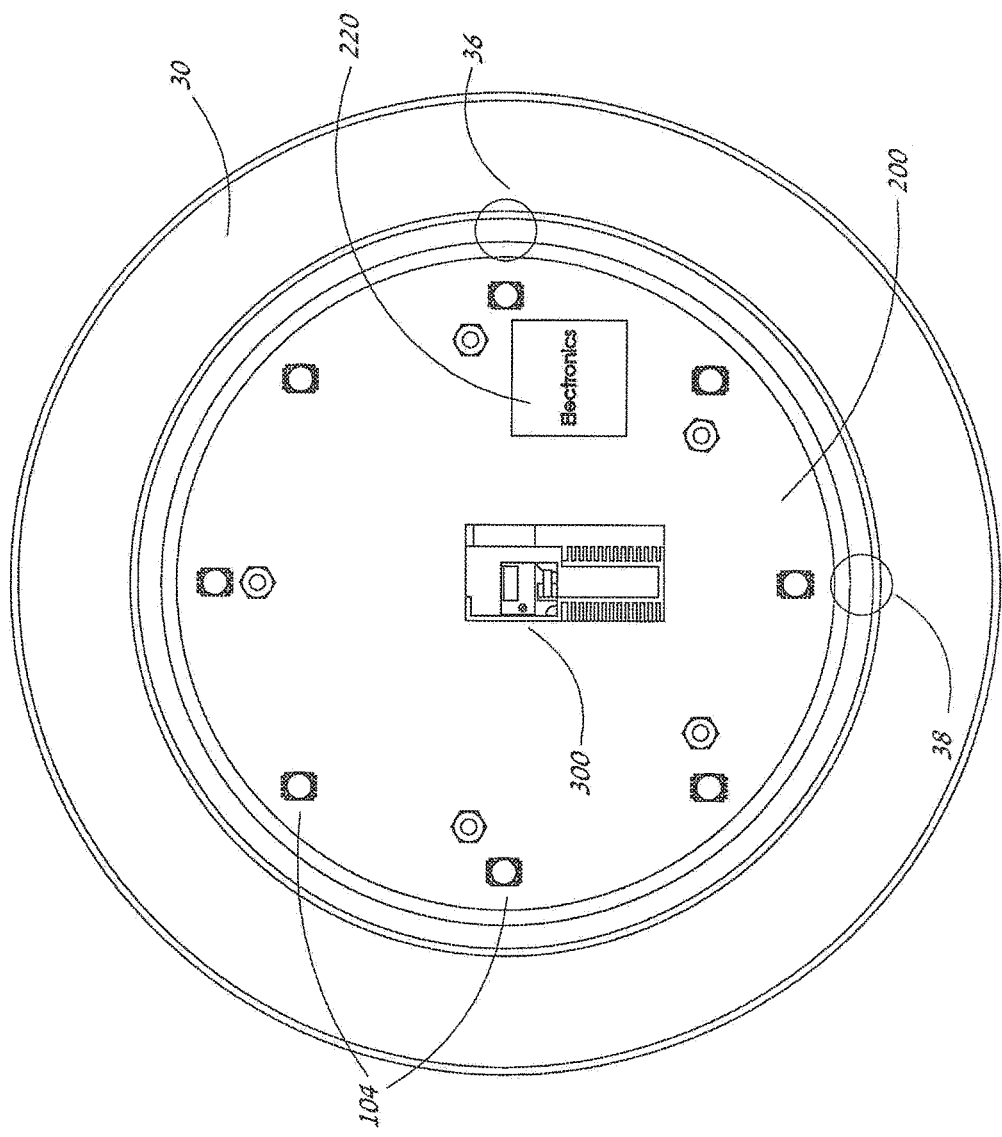

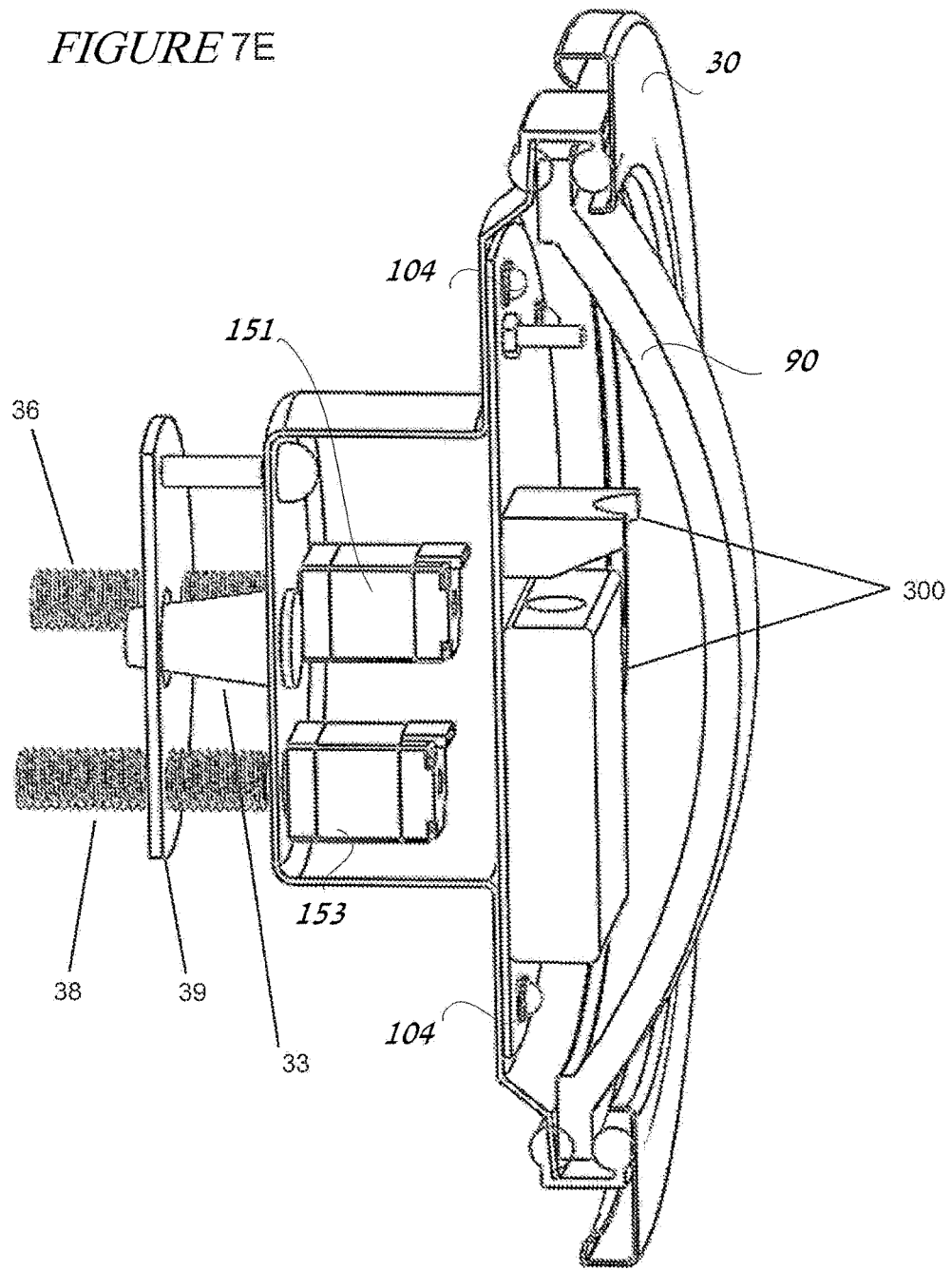

UNDERWATER IMAGE PROJECTION DISPLAY SYSTEM, LIGHTING CONTROL SYSTEM AND DEVICE AND METHOD OF OPERATING SAME

CROSS-REFERENCE TO RELATED APPLICATIONS

This application is a continuation of U.S. non-provisional patent application Ser. No. 13/769,813, filed Feb. 18, 2013, which is a continuation-in-part of U.S. patent application Ser. No. 13/533,966 filed Jun. 26, 2012, which claims priority to U.S. provisional patent application No. 61/600,639, filed Feb. 18, 2012, the entire contents of which are incorporated herein by reference.

COPYRIGHT NOTICE

Portions of the disclosure of this patent document contain material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

Field of the Invention

The invention relates to exemplary embodiments of devices, methods and arrangements for the display of images, static or dynamic, underwater and for a method and system for controlling the lighting and display of same alone or in coordination with changes in the ambient underwater lighting.

Background of the Invention

Underwater lighting has advanced over the course of many years, improving in safety along with the quality of visual effects. From the original incandescent white lights used solely for illumination of pools in poor lighting conditions, leaps in technology have now moved to the most modern and technically advanced water shows of today. The desire for better lighting and improved or enhanced effects has driven the market to these improvements. Static lighting in and around the pool or bodies of water come in an increasingly dazzling array of colors and perfusions with various optics and heat management devices and methods to provide ever more vibrant and ambitious displays of color in water.

Examples of some accent or background lights include

| # 6,472,990 | Delmar |
| # 7,357,525 | Doyle |
| # 7,410,268 | Koren et al. |
| # 7,699,515 | Faber |
| # 7,740,367 | Koren |

Additionally, there exist devices that are exterior to a pool or body of water for exciting visual displays or to provide enhanced pool safety, these include:

| # 4,196,461 | Geary |
| # 4,887,197 | Effinger |
| # 5,576,901 | Hanchett |
| # 6,278,373 | Jaurigue et al. |
| # 6,951,411 | Kumar et al. |
| # 7,810,942 | Kunkel et al. |
| # App. 2005/0146777 | Russell |

Similarly, several devices have been suggested that incorporate lighting, culminated or otherwise, in bodies of water, some examples include:

| # 5,934,796 | Quereau |
| # 6,086,215 | Giattino, et al. |
| # 7,482,764 | Morgan et al. |
| # 7,717,582 | Longoria et al. |
| # 7,744,237 | Potucek et al. |
| App. # 2010/0019686 | Gutierrez, Jr. |

However, to date, no commercially available application has been made of projection and illumination of graphics underwater or in a pool or body of water as a part of a display or as an illumination schema from under the water. Thus, there exists a need for a device and associated method of allowing for presentation of images and/or graphics from an underwater position to a point in an underwater environment. Such a device should meet the safety requirements for existing underwater lights, be compact, and provide pleasing images and/or graphics. Additionally, there exists a need for methods that allow for control of the graphics and ambient lighting such that they are synchronized to realize desired visual effects and adjustment of the projected images and/or graphics. The combination of graphics or imaging lighting and ambient or non-imaging lighting control and display should allow for strong contrasts in displays, providing heretofore unknown contrast and clarity in underwater projection.

SUMMARY OF THE INVENTION

The invention includes a method, a system, an apparatus, and an article of manufacture for underwater image display system and lighting control system.

An aspect of the invention is to provide a device and associated methods that allow for presenting images/graphics in underwater environments in a controlled fashion.

Another aspect of the invention is the projection of the applied image may using either the walls or bottom or both surfaces of the body of water, water feature, pool or spa for the projection of images, the spatial size and intensity of the graphics being controlled to accommodate for the projection surface and for the water through which the projection is being made.

A further aspect is to accommodate underwater projection of rendered graphics using techniques like vector graphics or raster imaging or the like and using systems like image projection systems such as LCOS, LCD, DMD, hybrid and laser projection technologies or vector graphics projection systems such as laser based beam steering or other steering and/or modulation devices either in monochrome or multi-color illumination.

A still further aspect is to provide for user input and communications through wired or wireless systems and provide a power input for both commercially available power inputs for bodies of water such as 12 VAC/24 VAC systems or for 120V outputs with a low voltage conversion safe for use in and around bodies of water.

Yet a further aspect is using vector generated graphics where the device may produce images that are monochrome or multicolor and multicolor images that are generated by using laser or LEDs or other light sources of multiple colors where the colors may be blanked using mechanical or electronic methods and may be combined using optics, for example Dichroic Prisms, or discretely made available to the beam steering or modulation mechanism.

A further aspect of the invention is to incorporate an underwater system that uses dispersion gratings, for example but certainly not limited to reflective or transmissive gratings, to create images when coherent light is incident on the grating.

A further aspect is to incorporate an underwater system that uses a spatial light modulation system, again for example but certainly not limited to reflective or transmissive systems, that can modulate the wave front to create images and/or patterns when coherent light is incident on the spatial light modulation system.

A still further aspect is to include an enclosure that allows for the device to be mounted within the confines of existing pool wall or boat hull mounting techniques.

Yet a further aspect of the invention is employing an additional image steering device beyond the initial projected image steering device to move the steered, projected image around within the confines of the body of the water feature, pool or spa.

A still further aspect provides an image projector that fits within a wall or niche in a water feature and projects an image from under the water into at least a target portion of the water feature and provides the ability to steer the image within the body of water or along a target within the body of water.

Another aspect of the device and method of operating underwater is a device or method capable of producing a plurality of vector graphics in a plurality of colors that work in combination with embodied light sources, for instance but certainly not limited to LEDs that are capable of producing a plurality of colors to serve as underwater ambient lighting.

A further aspect is a method allowing for control of the graphics and ambient lighting such that they are synchronized to realize desired visual effects with a combination of graphics and ambient lighting that allows for strong contrasts, for example green graphics with violet ambient light, red graphics with blue ambient light and the like.

Yet another aspect of the invention is a method and device or system for allowing for communication in a system where the image or graphic light generating devices are discrete from the ambient light generating devices where both or one of them is underwater.

Yet another aspect of the invention is a method that uses a several lenses to achieve a desired beam spread and focus.

Another aspect of the invention is the use of combined lenses with a transparent cover such that the combined lenses and cover provides waterproofing and the desired optical divergence/convergence characteristics.

Yet another aspect of the invention is a method that uses the power supply line or power toggling to cycle through sequences allowing for control of both, either together or independently, the ambient lighting color and/or intensity and image or graphics projection and sequencing.

The above aspects and advantages of the present invention are achieved by a method, an apparatus, and an article of manufacture for an underwater image projection system submerged in a body of water and projecting an image within said body of water.

The apparatus of the invention includes an underwater image projection system submerged in a body of water and projecting an image within said body of water having an enclosure, a lens assembly, with an at least projection element with an at least one projected light source projecting an image within said body of water. An at least one light source steering or modulating device is included and a system controller is coupled to and controls the at least one projected light source steering or modulating device and the at least one projected light source. A user input device is provided wherein a user inputs image data to the controller through the user input device and the controller interprets the image data into a set of image control variables and executes control the at least one projected light source in coordination and the at least one projected light source steering device with each other and projects the image through the projection element with the projected light source by controlling the at least one projected light source steering or modulating device and controlling the movement of the at least one further steering device to project from underwater a static or animated image on an underwater surface of the body of water.

An at least one ambient or non-projected light source can also be provided to operate in conjunction with the at least one projected light source. An at least one further image steering device can also be included. The at least one projected light source can be at least one of an at least one laser, incandescent bulb, halogen bulb, LED, HLED, gas discharge lamp, high intensity discharge lamp or the like for example. The at least one light source steering or modulating device can, be at least one of an at least one motor with mirror, galvanometer with a mirror, galvanometer with a dichroic reflector, DMD, LCOS device, LCD device, D-ILA device, SXRD device, and laser diode device or the like for example.

The underwater image projection system can include a lens element that covers an interface of said underwater image projection system with said body of water and allows light emitted from said underwater image projection system to pass into said body of water. The lens element can contain an at least one optic section, wherein the at least one optic section modifies the direction, shape, pattern, color, or wavelength of the emitted light from said underwater image projection system. The at least one optic can be a divergent optic. The at least one optic can be a convergent optic. The at least one optic can be a grating. The lens element can be interchangeable with lens elements having different optical properties to affect the light emitted by said underwater image projection display system.

The underwater image projection system can have software on the controller that allows a user using the user inputs to define the display area and parameters for display of the image. It may also have software on the controller that allows a user through the user inputs to define a pre-programmed operational call for the display of the image in combination with control of the ambient lighting. The operational call can be at least one of operation calls for display of a moving image or series of images controlling the image and non-image light sources of the instant invention or operation calls for display of a static image or images (such as in a slideshow) controlling the image and non-image sources of the instant invention or lighting shows that control and display light only effects controlling the non-image and/or image sources of the instant invention or an operation call for a multi-media presentation controlling both light sources of the instant invention and off-board elements, such as water features and sound systems.

The user input device can further comprise a user interface controller. The user interface controller can be remote from the enclosure. The user interface controller can be electronically coupled through a wireless or wired coupling to the system controller. The user interface controller can permit a user to select an operational call. The user interface controller can be provided with a graphical user interface for selection of image data. The user interface controller can have an input allowing a user to input image data from a computer readable media or through a wired or wireless coupling with a network. The user input image data can be stored on the user interface controller or the system controller.

The operational call can also cause said underwater image projection to communicate with additional system controllers controlling at least one of a further light source, a further water feature, a further video display, a further sound system, a further underwater image projection system, and a further pool or spa jet control system. The underwater image projection system can also include a master controller in communication with the systems controller. The master controller can receive programmed instructions and respond by sending signals to the underwater image projection system to display the image through the system controller and communicates further instructions to further display elements or control elements in communication with the body of water. The master controller alone or in conjunction with a user interface can download new operational calls and instructions from a network.

The at least one laser light source can have sensors monitoring laser light output variables or the safety system further comprises sensors monitoring laser light output variables or the safety system observes variables from the beam steering or modulation system and if abnormalities are detected the safety system shuts down the at least one projected light source. The underwater image projection system can have a system to measure the ambient light conditions in the body of water and uses measurements from this system to control image or non-imaging light sources.

The enclosure can further comprise an at least one secondary enclosure, the enclosure having the at least one projection light source and at least one projected light source steering device contained therein and the at least one secondary enclosure having the at least one ambient or non-projecting light source therein. The enclosure can contain the at least one projection light source and at least one projected light source steering or modulation device. The enclosure can be watertight.

The underwater image projection system can also include an at least one heat sink for cooling the underwater image projection system. The enclosure can provide for a separate watertight enclosure portion while permitting exposure of the heat sink to water from said body of water or has a thin walled section to promote cooling of the heat sink through said section.

The master controller can be outside the body of water and the enclosure. The master controller can be separate from a user interface controller having a user interface with the user input thereon and both are outside the body of water and the enclosure. The master controller can be separate from the user interface controller having a user interface with the user input thereon and both can be outside the body of water and the enclosure. The master controller can further control an at least one of an at least one sound systems, boat controls, water features, bubblers, fountains, waterfalls, laminar jets, water effects, accent lights, pool lights, water special effects, pyrotechnic controls, lights and pool controls. The underwater image projection can further include an at least one user interface controller having a user interface with the user input thereon. The user interface is outside of the enclosure and coupled to the system controller to provide control inputs.

The underwater image projection system can include a further lens element separate from the lens element in contact with said body of water and having an at least one optic section, wherein the at least one optic section modifies the direction, shape, pattern, color, or wavelength of the emitted light from said underwater image projection system. The underwater image projection system can also include an ambient light sensor sensing the light ambient light condition in the body of water. The user input can include an at least one switch which cycles through a selection of pre-programmed images and operational calls modifying the display of the pre-programmed images. The underwater projection system can further include a separate remote user interface providing wireless communication with the underwater image projection system, wherein the at least one switch is located thereon.

The method of the invention includes a method for controlling underwater projection of images in or from a body of water, comprising inputting an image into a controller; interpreting the image into executable control data through the controller; controlling an at least one underwater image projection device in the body of water with the controller using the control data; controlling an at least one non-imaging device in conjunction with the at least one image projecting device in the body of water with the controller using the control data; and displaying the image in the body of water.

The method of controlling an underwater projection of images in or from a body of water of claim where the step of controlling an at least one underwater image device can further comprise controlling multiple underwater image devices in a synchronization with one another. The step of controlling an at least one non-imaging light source can further include controlling multiple non-imaging light sources in synchronization with one another and the at least one image projecting device. The method of controlling an underwater projection of images can further include inputting through a user interface by a user a program or a pre-programmed input of an at least one operational call into a controller for the at least one underwater projection device, the operational call providing instructions on manipulating the control data and synchronizations for the operation of the at least one underwater projection device and the at least one non-projection light source to provide the desired visual display encoded in the operational call.

The method of controlling an underwater projection of images in or from a body of water can further comprise controlling an at least one off-board feature in the body of water or outside the body of water as part of the operational call.

A computer system for performing the method and a computer-readable medium having software for performing the method of controlling an underwater projection of images in or from a body of water are also provided.

The method of the invention includes a method of operating an underwater image projection display system comprising: Starting an image projection display system, engaging an at least one startup code segment on a controller, powering up, and testing the underwater image projection display (UID) system through a user input or interface or remote command; Inputting an image by engaging an at least one input code segment on a controller which produces input image data which is processed by image data deconstruction and compilation code segments on a controller resulting in image controller readable data that is stored or transmitted or stored and transmitted to/in the UID system together with an image display operational call; Translating and/or compiling by engaging an at least one translation and/or compilation code segment on a controller which translates and/or compiles the stored image data through a set of instructions corresponding with the operations call for the type of display into machine readable instructions for the UID system components and any additional systems as indicated by the operations call; Transmitting and commanding by engaging an at least one transmission and control segment on a controller, which transmits the machine readable command instructions to the drivers of the components of the UID system based on the operations call to activate the UID system and any additional controlled systems depending on the operations call; Projecting a resulting image through an at least one code segment on a controller controlling the hardware of the UID system and the image data, image controller data, additional data, and any additional selected variables or adjustments based on user input or sensors resulting in the projection of an image/graphic, either static or in motion, or desired color effects with coordinated outputs for the additional controlled elements for the selected operations call; and Resetting or looping the UID system by engaging an at least one reset/loop code segment on a controller allowing the user to adjust, reset, or loop the operations call to allow for changes in sequencing of an image(s) or to add multiple operations calls in the UID system display or adjusting the start or ending of a projection or to allow for a reset, shutdown, and restart of the image projection system via input from the user.

The apparatus of the invention includes a computer including a computer-readable medium having software to operate the computer in accordance with the invention.

The article of manufacture of the invention includes a computer readable medium having software to operate a computer in accordance with the invention.

Moreover, the above aspects and advantages of the invention are illustrative, and not exhaustive, of those which can be achieved by the invention. Thus, these and other aspects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIGS. 7D and 7E show a front and a cross-sectional view respectively of a further exemplary embodiment of the instant invention using an underwater projection device and a further image steering mechanism.

DETAILED DESCRIPTION OF THE INVENTION

The instant invention is directed to an underwater projection system and controller for controlling image lighting and non-image lighting while projecting to a point in the body of water an image. The image projection system has an enclosure, an at least one image lighting element/source, an at least one beam/line/projected light source steering device, an at least one system controller and at least one user input or user interface. The user enters an image or image selection through the user input or interface, the system analyzes and converts the image to machine instructions and projects the image through the image projection system and optionally coordinates this in conjunction with the operation of the non-imaging lighting as disclosed herein below.

Figure 1A:
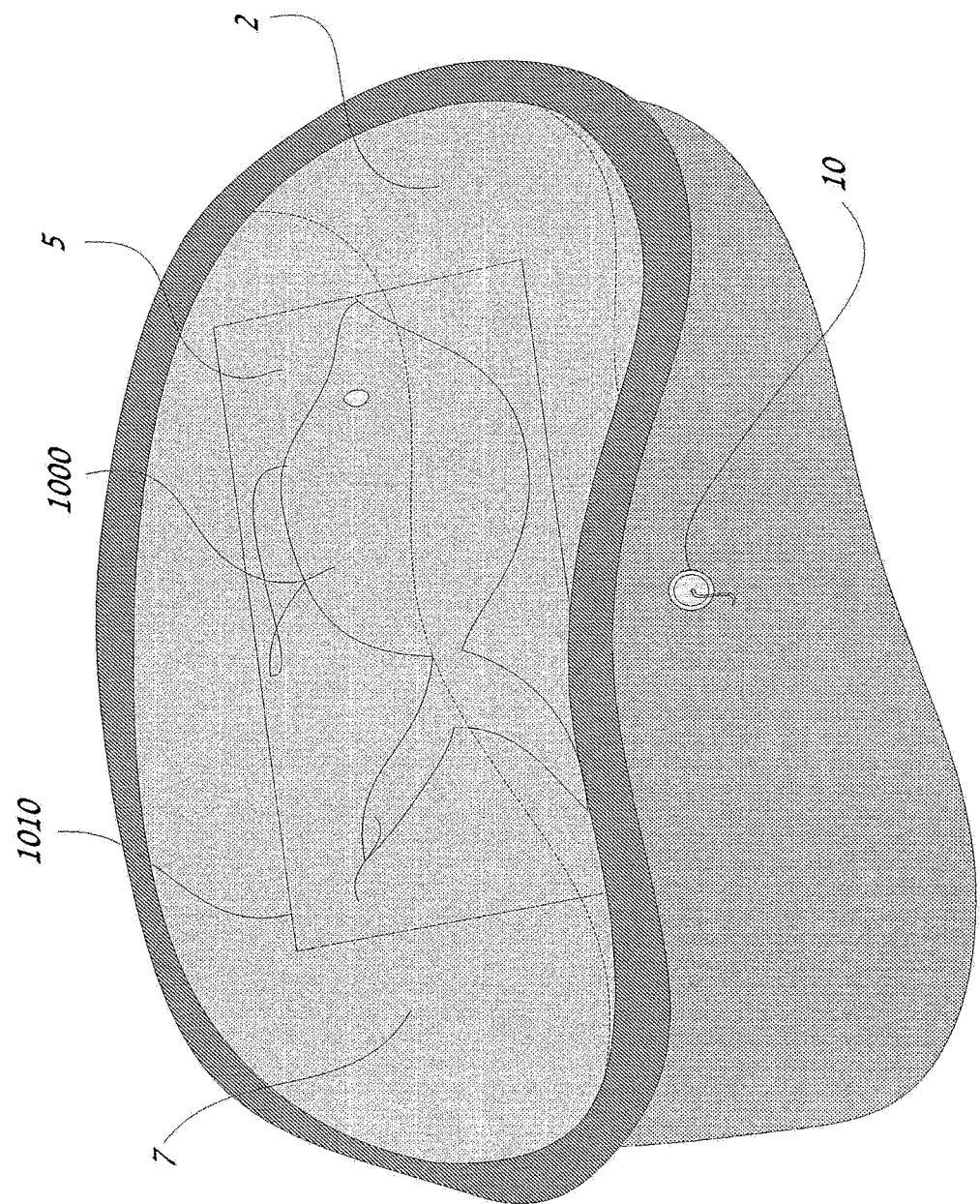
FIG. 1A shows a plan view of an exemplary embodiment of the instant invention in a body of water projecting an image on a curved surface.
Figure 1B:
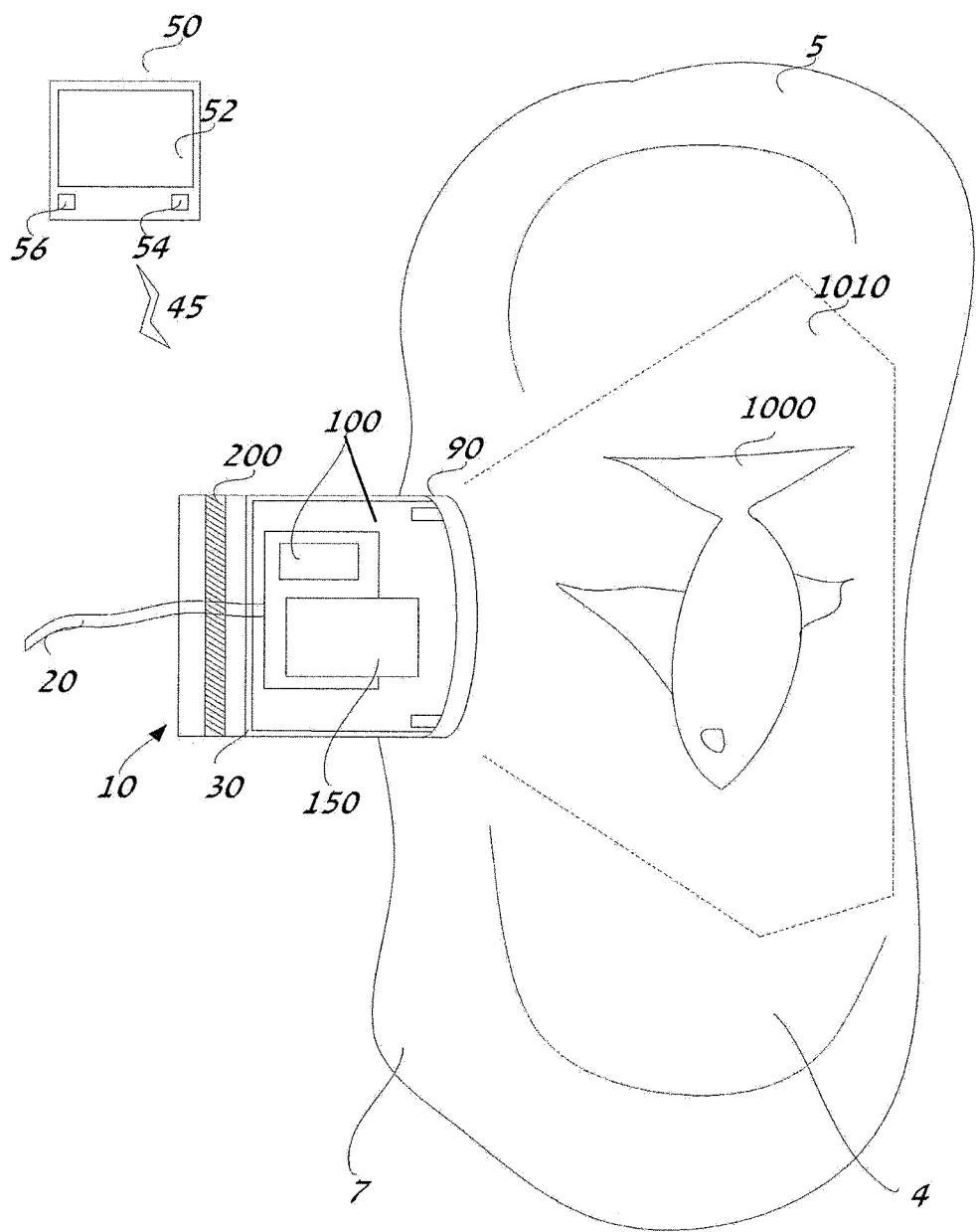
FIG. 1B shows a plan view of an exemplary embodiment (not to scale) of the instant invention in a body of water projecting an image into a body of water.

FIGS. 1A and 1B show plan views of an exemplary embodiment of the instant invention in a body of water projecting an image into a body of water. The exemplary embodiment of the underwater image projection display system 10 is shown with an enclosure 30 provided for use underwater in a body of water 7, in this case a pool. The underwater image projection display system 10 projecting an image 1000 on a target surface 1010 in the body of water 7 or on an object in the body of water (not shown), in this case a side 5 and/or bottom 2 of the pool. The term image, as used herein, encompasses any static or non-static image stored in any form that can be interpreted by the associated elements of the underwater image projection display system for display. The enclosure 30 can be mounted in a recess within the wall of the pool or body of water 5 or separately mounted underwater (not shown). The enclosure 30 can be water tight or can provide for flow of water to specific cavities (not shown) to provide for additional cooling while allowing for an at least one watertight electronics compartment(s).

As seen in FIG. 1B, an at least one image projection element or device 100 is provided. The exemplary embodiment is shown having a single image projection element 100 which is coupled to an electrical source (not shown) through an electrical safety connector 20. In further embodiments, as described below, additional image projection elements may be added in the system. These additional projection elements may be engaged in the system or incorporated into the device without departing from the spirit of the invention. Similarly, additional embodiments may include a self-contained power source as a component of the enclosure.

The enclosure 30 also provides for a lens element 90. The lens element 90 may be clear allowing for direct transition of light emitted by the image projection element 100 and an at least one ambient or non-image projecting light source 104. The lens element 90 may also be comprised of several smaller lens elements or may have a pattern etched into it to affect the projection of light from the image projection element 100 as needed for proper projection of light emitted from the image projection element 100 or the ambient or non-projection light element 104. The lens element 90 may be for instance, but certainly is not limited to, a divergent and/or convergent lens at a point for the image projection of light from the at least one image projection element so as to provide a necessary increase in field of projection or similar changes in the display of the projected elements into the body of water 7. The lens element 90 can also be made to be interchangeable or replaceable without impacting the soundness or waterproofing of the housing 30. Further, as the image light projection is also steerable as discussed below, different effects may be included in different areas of the same lens element 90, as further discussed herein below in regards to FIG. 2.

As seen in FIG. 1B, a system controller 200 is provided to control the elements of the exemplary embodiment as shown. The system controller 200 manages and operates the elements of the image projection device 100 and is coupled to and communicates with a user interface controller 50 in this exemplary embodiment. The system controller may also operate the entirety of the underwater image projection display system 10 in further exemplary embodiments. The controllers 50, 200 include software to operate themselves and the underwater image projection display system 10. Software refers to prescribed rules to operate a machine, controller, or machine or device operated with a controller or driver. Some non-limiting examples of software include: software; code segments; instructions; computer programs; and programmed logic and the like.

The device or system controller 200 is shown as a dedicated printed circuit board 201 with functional elements as discussed herein below. The controller 200 can also for example refer to, but is certainly not limited to, any apparatus that is capable of accepting a structured input, processing the structured input according to prescribed rules, and producing results of the processing as output. Some non-limiting examples of controllers include specialized control circuit boards; a computer; a portable computer a networked computer system; a hybrid combination of a computer and an interactive controller; a tablet; a touchscreen based system; a smart phone; application-specific hardware to emulate a computer and/or software and the like. A controller can have a single processor or multiple processors, which can operate in parallel and/or not in parallel. A controller can also refer to two or more of these or other examples connected together via a network for transmitting or receiving information between the controllers, such as in a home or house network or a distributed computer system for processing information via controllers linked by a network and a cloud server or enabled cloud computing devices. A network may also include several projection devices or other display devices, such as but certainly not limited to, sound systems, boat controls, water features, fountains, water special effects, pyrotechnic controls, lights and similar devices.

The user interface controller 50 in the exemplary embodiment is shown as coupled to and communicating with the system controller 200 through a wireless link 45. Additional exemplary embodiments, like those shown below, provide for wired coupling and communication as well, for instance through an RS-485 wired connection. The user interface controller 50 is used to provide input to the underwater image projection display system 10 and provide for control by a user. The input can be accomplished through any number of mechanisms, from touch screens to keyboard to voice activation and similar user input devices. The user interface controller 50 can be as advanced as a fully customizable touch display or may simply provide for limited number of inputs, such as an on/off switch and corresponding arrow buttons to interface with a display. In this exemplary embodiment a touch enabled tablet display is provided as the user interface controller 50.

The user interface controller 50, the tablet in this case, is provided with an information storage device, in this case non-volatile memory 56, to store both a graphical user interface 52 and software to interpret input from the graphical user interface 52 and its own processor with the memory 56. An "information storage device" refers to an article of manufacture used to store information. An information storage device has different forms, for example, paper form and electronic form. In electronic form, the information storage device includes a computer-readable medium storing information such as, but certainly not limited to, software and data and similar electronic information. In further exemplary embodiments of the instant invention additional information storage devices, such as but certainly not limited to dedicated volatile or non-volatile memory, can be provided to receive and store images from users on the user interface controller 50.

This image data can be provided by a user via an external memory storage device or other computer readable media, through an interface, here shown as port 54. It can also be provided through a wireless connection, a wired connection, or through a network connection either as discrete files or streamed as packets. For instance, a stream of packets over the World Wide Web or through a router or other device. Additionally, the image data 1100 as discussed herein below may also be transmitted and stored on the system controller 200 to improve display handling efficiency. In this exemplary embodiment, the image data 1100 is transmitted to and stored on the controller 200, as described in greater detail below, so as to provide no delay due to wireless connection issues.

It is also important to note that the surfaces within the body of water 7 that image 1000 is projected on, as shown in the exemplary embodiment, is non-uniform. That is the image surface has a curvature. Additional software on the controllers 50, 200 provides for input and control of points of adjustment of the image 1000, as described in further detail below. This allows the user and/or the system to adjust the display and compensate for both the conditions of the water being transmitted through and the surface the display is being shown on. This can be accomplished manually or automatically or through a combination of both by the controllers 50, 200 and the user. The instant invention can be trained to understand the limitations and shape of the targeted portions of the body of water.

Figure 2:
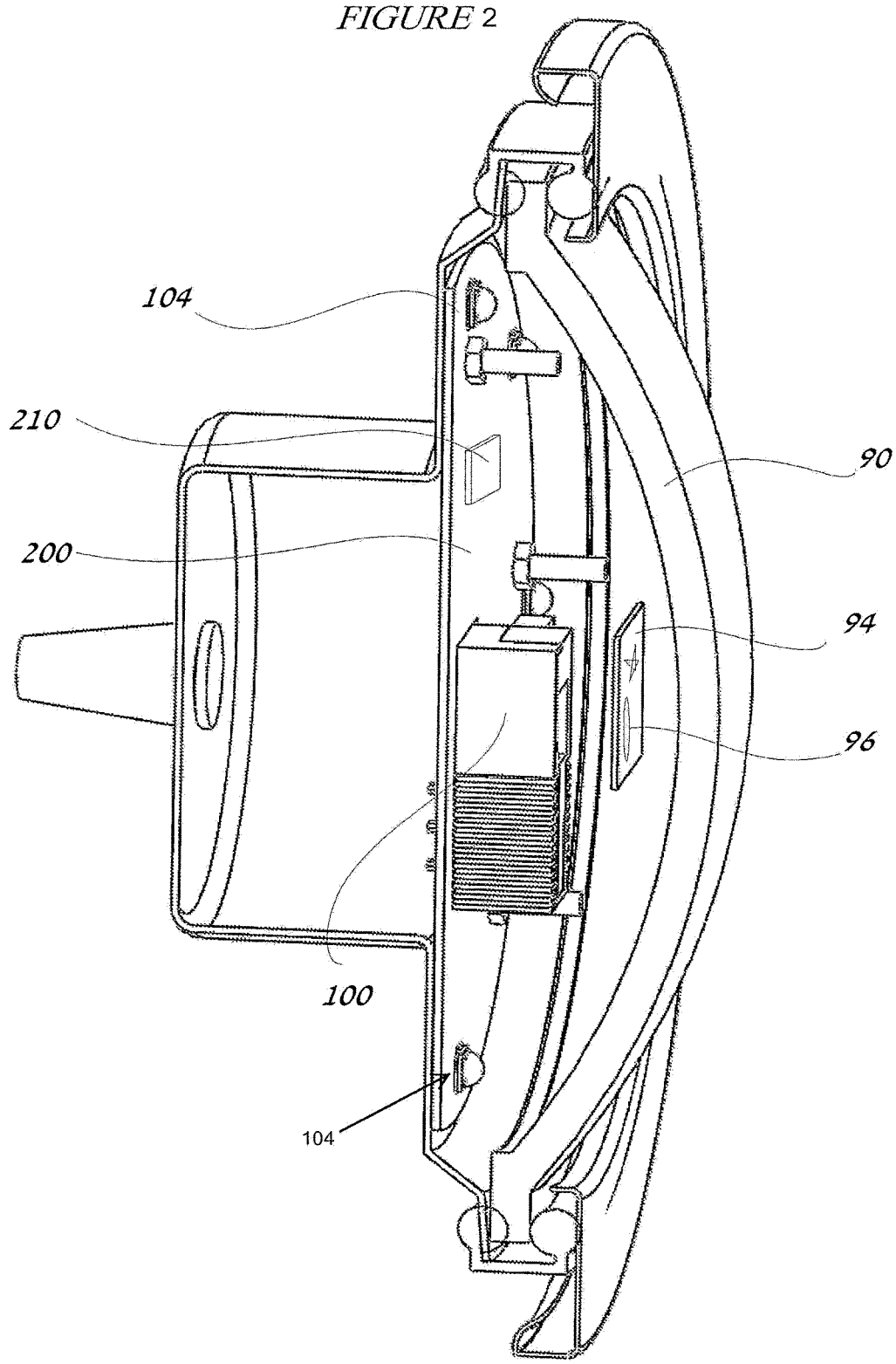
FIG. 2 shows a cross sectional view of an exemplary embodiment of the underwater light projection display system of the instant invention.

FIG. 2 shows a cross sectional view of an exemplary embodiment of the underwater light projection display system of the instant invention. As seen in FIG. 2, lens element 90 has various patterns etched on it to provide desired optical characteristics. In the exemplary embodiment shown, a section 92 is provided which has a grating that actively diverges the image 1000 that is projected. Another section 94 is provided that allows for a reflective transmission grating. Another section 96 provides for a convergent optic. The lens element 90 may also be provided with a motor or may be manually moved to accommodate changes in lens or optical characteristics. Additional covers may be provided and substituted for the one shown that provide alternative optics. Further, other exemplary embodiments may provide that the lens element 90 may itself be entirely directed to a single optic or optical effect without departing from the spirit of the invention.

Figure 3:
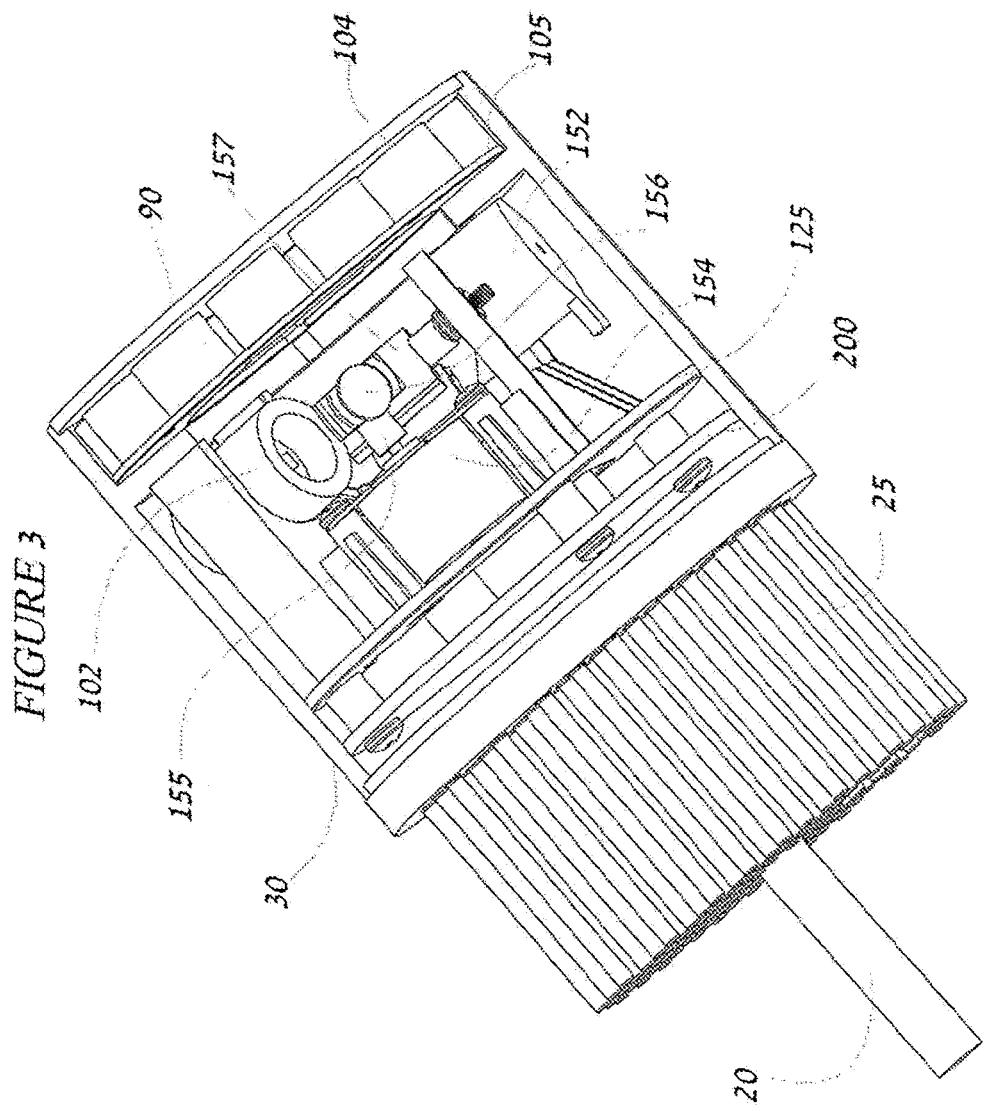
FIG. 3 shows an isometric view of an exemplary embodiment of an image projection device.

FIG. 3 shows an isometric view of an exemplary embodiment of an image projection device. The image projection element 100 has an at least one image projection or projecting light source 102. The image projection element 100 is also provided with an at least one beam/line/projected light source steering or modulating device 150. In this instance the beam/line/projected light source steering or modulating device 150 is coupled to an at least one motor 152 with a mechanical coupling/transmission mechanism 155. The beam/line/projected light source steering or modulating device 150 is also coupled to a system controller 200. The system controller 200 is provided with software comprised of specific code segments to drive and control the beam/line/projected light source steering or modulating device 150 to steer the output of the image projection element 100, as discussed herein below, which results in an image output 1000 which can be static or moving/animated. The components of the image projection element 100 are mounted to an at least one chassis 125 and coupled to the controller 200 as shown. The controller 200 is thermally coupled to a heat sink 25 to provide for cooling of the controller 200 and the image projection device 100.

In the exemplary embodiment shown, the at least one image projection element 100 is shown as a single projection element or projector. There can be any number of projectors or projection elements within the housing 30 or operating together in the same body of water or water feature 7 attending to image projection duties without departing from the spirit of the invention, but for illustration purposes reference is made to the non-limiting exemplary embodiment of FIG. 1. The projection element 100 has an at least one projection light source or projected light source or graphic light source 102. In this instance the projected light source 102 is a single class 3 LASER. Other non-limiting examples of projected light sources include but are not limited to incandescent bulbs, halogen, LEDs, HLEDs, gas discharge lamps, high intensity discharge lamps and the like. These can be individual projected light sources or combined into a projection device, such as a digital mirror device (heretofore and hereinafter: "DMD") sold under the trademark DLP®, LCOS, LCD, D-ILA, SXRD, laser diode, spatial light modulation systems or the like. There may be any number of projected light sources; the example shown is a non-limiting example of the type and number of projected light sources. Further embodiments are disclosed herewith as further non-limiting examples of exemplary embodiments of the instant invention that utilize multiple light sources. The projected light source 102 is coupled to the controller 200 and controlled therewith as further described below.

The projected light source 102 is mounted on the chassis 125. The chassis also mounts the at least one projected light source steering device 150 with a mechanical coupling/transmission mechanism 155 coupling to the at least one motor 159. In the exemplary embodiment shown in FIG. 1, the at least one beam/line/projected light source steering device 150 is shown as a first, panning beam/line/projected light source steering device 152 coupled to and controlled by the system controller 200 and a second, yaw beam/line/projected light source steering device 154 coupled to and controlled by the system controller 200.

Each of the first and second beam/line/projected light source steering devices 152, 154 are shown as mirrors for directing or steering the projected light source 102. Each of the beam/line/projected light source steering device 152, 154 are coupled via a respective shaft member 156, 158 to a motor 159, in this exemplary embodiment each beam/line/projected light source steering device having its own motor. The motors 159 are coupled to the controller and are activated by the system controller 200 to direct or steer the projected light source 102 in accordance with the software on and methods of controlling and operating the system controller as described herein below. Similar embodiments may utilize, as a non-limiting further example, a galvanometer or pair of galvanometers to translate and rotate the pitch and yaw respectively in the exemplary embodiment.

Additional embodiments may utilize fewer beam/line/projected light source steering devices, for instance a single faceted ball or a single drive motor with a more complicated transmission system may be utilized to provide for both pan and yaw motion or additional axis of control, all of which may also be provided without departing from the spirit of the invention. Additionally, some other non-limiting examples of projected light source steering or modulating devices can include but are not limited to reflectors, dichroic reflectors, mirrors, DMD, LCOS, LCD, D-ILA, SXRD, laser diode, and similar devices. The number and examples of the projected light source, the beam/line/projected light source steering devices, and motors can be varied without departing from the invention.

In addition to the projected light source 102, the instant invention is used in combination with an at least one ambient or non-projected light source 104 to assist in projecting graphics underwater. In this instance, the at least one ambient or non-projected light source 104 is shown as a ring of high brightness light emitting diodes (HBLEDs). The at least one non-projected light source 104 is optional and may be independent of the instant invention, including independently controlled. The at least one non-projected light source 104 in the exemplary embodiment shown is coupled to the system controller 200 and is operated in conjunction with the projected light source 102. The ambient light source 104 may also include additional lights not included in the enclosure 30 with the image projection element 100. These light(s) being coupled to the controller 200 and operated to support the image projection element 100 and the imaging duties it performs. The lights may include, for instance but are certainly not limited to, existing pool lights, after market accent lights, additional lighting and display elements such as fountains, bubblers, and the like, or similar sources of light within or without the body of water 7.

In the exemplary non-limiting embodiment of FIG. 3, the beam/line/projected light source steering device 150 is moved such that a pixels or dot projected by the projection element 100 are steered or modulated at a high rate of speed to produce the resulting image output 1000, relying on the persistence of vision or phi phenomenon as the perception by the human eye to see the existence of an image even when the image has changed or been removed. Similarly, several projection elements 100 may be used in conjunction to provide the effect and improve response in the rendering of the image. The image projection element or source 100 and the at least one beam/line/projected light source steering device 150 are controlled by a system controller 200 with software thereon. The software includes multiple sub-components or code segments for specific functional instructions for the elements of the device. The software and the controller are used to convert images 1020, as discussed herein below, to image data 1100 that is then interpreted and conveyed as instructions to the components of the underwater image projection display system 10, as discussed in greater detail herein below. By quickly moving and tracing an image, the full image appears before the human eye. In the instant invention, the at least one beam/line/projected light source steering device 150 rapidly moves the dot/pixel projected by the projection element 100 at a speed that results in the image output 1000 being perceived by the human eye as a persistent image either static or in motion on a target surface or portion 1010 in the body of water 7, for example but certainly not limited to a pool. Additional exemplary embodiments may utilize further projection means and principals to project the image sufficient for display from the underwater imaging system in the body of water.

In the exemplary embodiment of FIGS. 1-3, this movement is provided in a single axis or multiple axis as determined by the at least one beam/line/projected light source steering device 150. The control of the at least one beam/line/projected light source steering device 150 is through software on the controller 200. Further discussion of the operation and implementation of the software and electronics are described in greater detail in relation to FIGS. 4-6.

Figure 4:
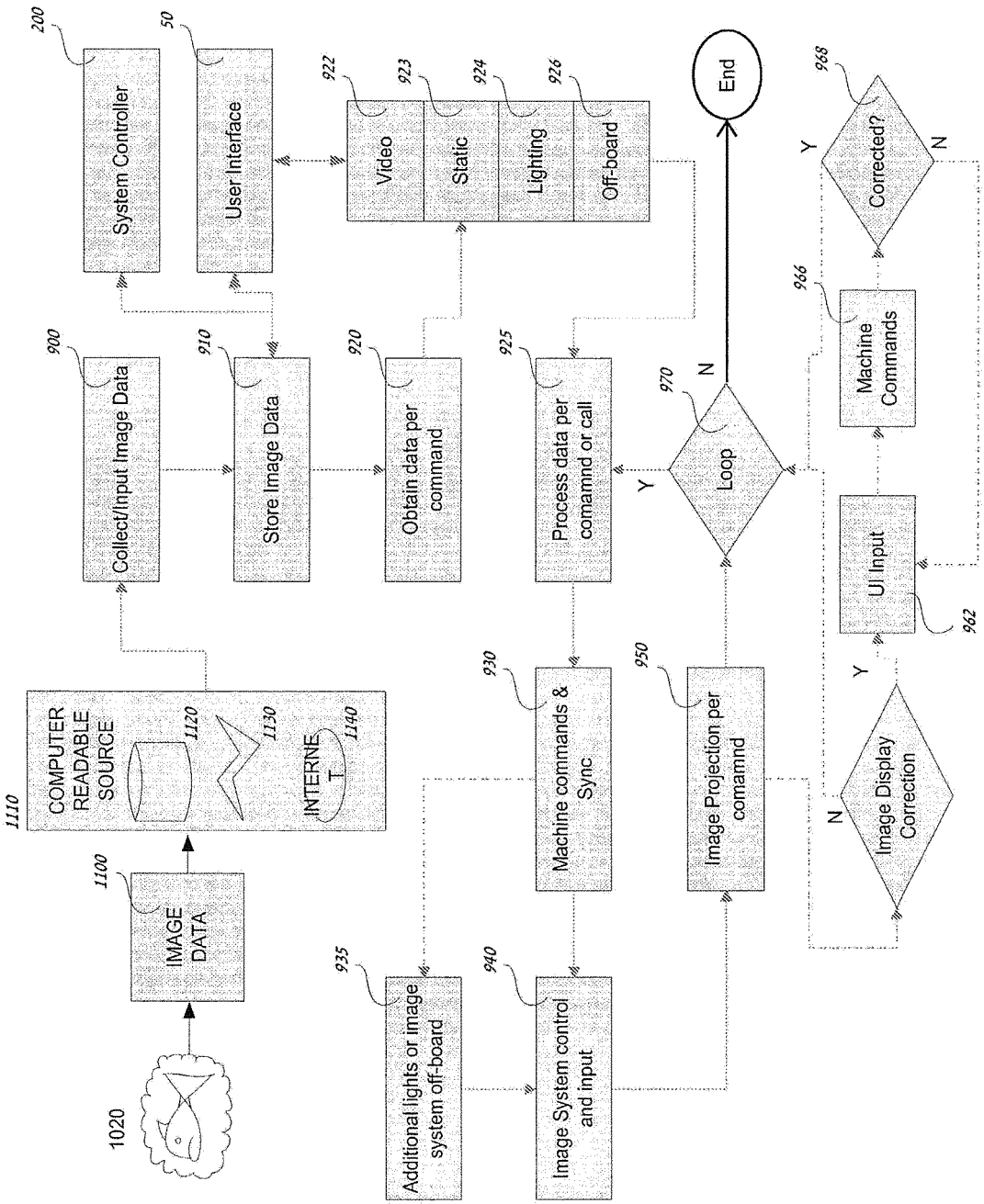
FIG. 4 shows a plan view of a method of operation of an exemplary embodiment of the invention.

FIG. 4 shows a plan view of a method of operation of an exemplary embodiment of the invention. As noted above, either the user interface controller 50 or the system controller 200 can be utilized to process image data. This may be done in stages on either or both controllers or may be isolated to operations on one or the other controller.

As noted above, in the exemplary embodiment shown in FIG. 1, the controllers 50, 200 have software for handling images 1020 and translating the image 1020 to image data 1100 for further communication and translation to control outputs for the underwater image projection display system 10. The user interface controller 50 allows for input of data from an image 1020 or series of images or moving images or video that are reduced to or provided as image data 1100 and stored in a computer readable format as a computer readable source 1110. Any standard format for image or video recording may be utilized. Some non-limiting examples include but are not limited to JPEG, GIF, Exif, TIFF3, PNG BMP, PPM, PGM, PBM, PNM, WEBP, CGM, SVG, AVI, MPEG, FLV, and similar image and video formats. Based on this compression and storage, the image 1020 can be reduced into or provided as image data 1100. A first step in preparing for the operation of the instant invention then is the reduction of an input image 1020 into image data 1100 or provision of the image data 1100 to be transmitted as a computer readable source 1110.

The image data 1100 is stored on an at least one computer readable storage media, for instance, but certainly not limited to, in the exemplary embodiment shown volatile RAM memory or an SD chip or the like as a computer readable source 1110. Alternatively, the image data 1100 may be transmitted by a wired connection or a wireless connection 1130 or through a network 1140 to the system controller 200 or on the user interface controller 50. In a further exemplary embodiment, the system controller 200 has memory that provides for a library of pre-stored image data and operational calls. The library may be used in conjunction with further user input image data or may be limited to the images in the library only. In this embodiment, an at least one user input, for instance a power button, allows for toggling through the pre-programmed images and displays in the underwater image projection display system 10.

In a first step after image acquisition, the image is collected from the computer readable source 1110 in step 900. In programmable embodiments, code segments in the software on the system controller 200 receive and store the image data in step 910. As discussed above, the storage device may be located on either the system controller 200 or the user interface controller 50 or can be an input from a network 1140 or other wireless or wired connections 1130 into a computer readable media such as a memory buffer or provided on a computer readable media 1120. The result is storage of the image data 1100 in a form usable by the underwater image projection display system 10 and managed by code segments on either the user interface controller 50 or the system controller 200 or both.

In step 920, the image data is stored in the underwater image projection display system 10. Then code segments are utilized in step 925 to interpret and extract the image data 1100 from the storage step 920. An operations call is made from the data input at the user interface 50. Operations calls or "shows" are sets of software or pre-programmed instructions for the display of the image data 1100. These can be pre-programmed, downloaded, or entered by a user. Customizations and alterations may be provided for in some embodiments. The operations call data is sought at step 920 some examples of operations calls are operation calls for display of a moving image or series of images controlling the image and non-image light sources of the instant invention 922; or operation calls for display of a static image or images (such as in a slideshow) controlling the image and non-image sources of the instant invention 923; or lighting shows that control and display light only effects controlling the non-image and/or image sources of the instant invention 924; or an operation call for a multi-media presentation controlling both light sources of the instant invention and off-board elements, such as water features and sound systems 926. Additional elements, water feature elements and/or sound systems can be incorporated in other operation calls and controlling media through similar "shows" in an analog fashion may also be provided as selectable user inputs, for example switches, as well. The user interface 50 provides for selection of the operations call by the user, as indicated by the communication line from the user interface to the code segment as an input. Additional elements can be provided for the user interface 50 to be used to provide programming of customized operations calls. These operation calls provide instructions on modifying and manipulating the image data 1100 stored in step 920. The stored image data 1100 is processed as display data in step 925.

The operations call initiates the extraction and interpretation code segments to access the image data 1100 stored in step 920 as noted and processing display data in step 930 per the command call. The image data 1100 is then translated via a further image translation code segments that translate the display data 1100 into movement inputs for the machine control code segments and system controller 200 in step 925. The extraction and interpretation step 920 and the processing step 925 provide display data inputs to the machine commands and synchronization step 930.

The data transmitted from the image data to display data translation step 925 is interpreted in the machine control and synchronization step 930 and a set of movement commands are output from the machine control step and synchronization step 930. The movement commands allow for movement of the at least one beam/line/projected light source steering device 150 to commence with the rapid movement of the at least one beam/line/projected light source 150 to draw or project the image 1000 on the target portion 1010 of the body of water 7.

In addition to the movement commands, image color data, depth of field data, and similar image variables can also be stored, retrieved, and translated into machine instructions. The image color data can be used to change the color of the image source light or can be used in multiple projection and non-projection light source devices to change colors for the operations call. Similarly the image data can also include non-projection image or ambient light data. The non-projection image light data can be used in conjunction with an at least one ambient light source, for instance, but certainly not limited to, multiple high brightness LED light sources in pendent lights in the body of water. These HBLEDs can be varied in color to provide contrast color to the beam/line/projected light source or simply for visually pleasing effects in conjunction with the image display.

Synchronization in step 930 can optionally engage additional light sources, image or non-image alike, or additional components, such as but not limited to water features, bubblers, fountains, waterfalls, laminar jets, water effects, accent lights, pool lights, sound systems, boat controls, pyrotechnic controls, pool controls, or similar components, in step 935. The optional communications step 935 may be included and initiated by the operations call in step 920. The synchronization in step 930 and the communications with additional components in step 935 can include multiple projection elements like those shown in FIGS. 10-12. It can also engage and synchronize multiple elements in a single enclosure.

In step 940, the image projection system component controllers/drivers with code segments for driving same are engaged and machine data alone or in conjunction with additional image data is transmitted from the machine command and synchronization step 930 to drive movement in the underwater image projection display system 10.

After communicating the machine commands to the drivers in steps 930-940 the image 1000 is projected by the underwater image projection display system 10. The image 1000 is displayed underwater in the body of water 7 on a target portion 1010. In an optional further step, a method of correcting the image 1000 is provided to accommodate making changes to the displayed image to fit the display environment as it is displayed in step 950.

In this case, in optional step 960, the need for image correction is identified. This can be done automatically or manually or as a combination of both automatic and manual components of the projection system and the user. The method of operation proceeds to step 962, in the exemplary embodiment, to obtain input from a user. This, is optional, as automatic image correction could be conducted without user input. However, input from the user can be sought through user interface controller 50. An image correction command is selected in step 962 and applied in step 966. The image correction may be applied directly or a preview may be provided through the user interface. Examples of the methods of image correction are discussed in further herein below. A final check is made in step 968 to determine if additional correction is needed. The affirmative branch loops back to step 960. The negative branch returns proceeds to step 970.

Finally, once the image has been displayed and the instructions in the operating call have been executed, the system may be looped to continue the instructions per the operating call or show and continue to send control instructions to the image projection system or it may be returned to a starting state/end state in step 970. In this way, the instant invention takes an image as input from a user, stores the image data, retrieves and interprets the image data in response to an operations call, converts the image data to machine inputs, executes the machine inputs and causes an image to be displayed per the instructional data of the operations call. The method of operation can include additional components, such as but not limited to additional imaging and non-imaging lights or water features or sound systems, which can be synchronized per the synchronization step. Additional image data, such as but not limited to color and dimensional data, may also be stored and utilized in the display system. Finally, an optional method of correcting the image for display in the typically non-uniform surfaces of the body of water is also provided.

Figure 5A:
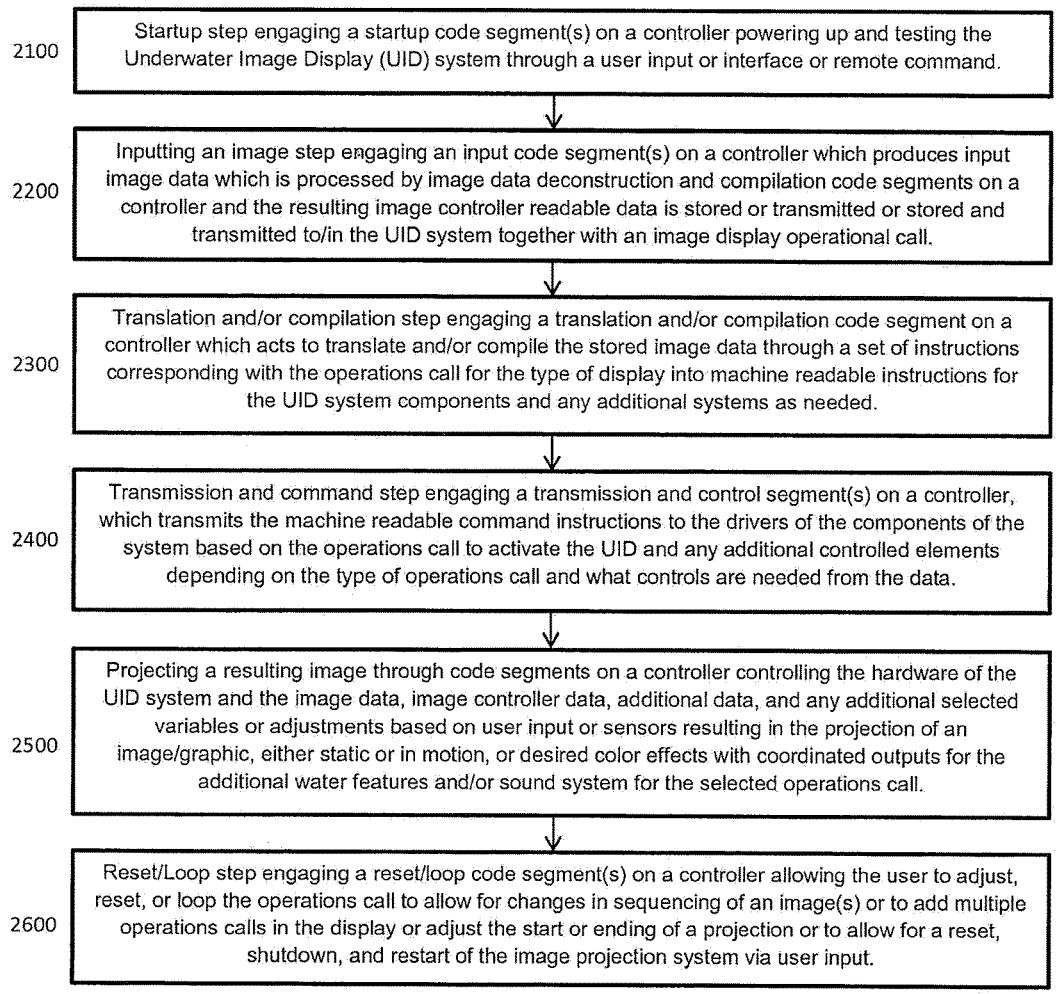
FIG. 5A shows a flowchart for an exemplary embodiment of the operation of software on an article of manufacture and a method of operating an underwater image display system.
Figure 5B:
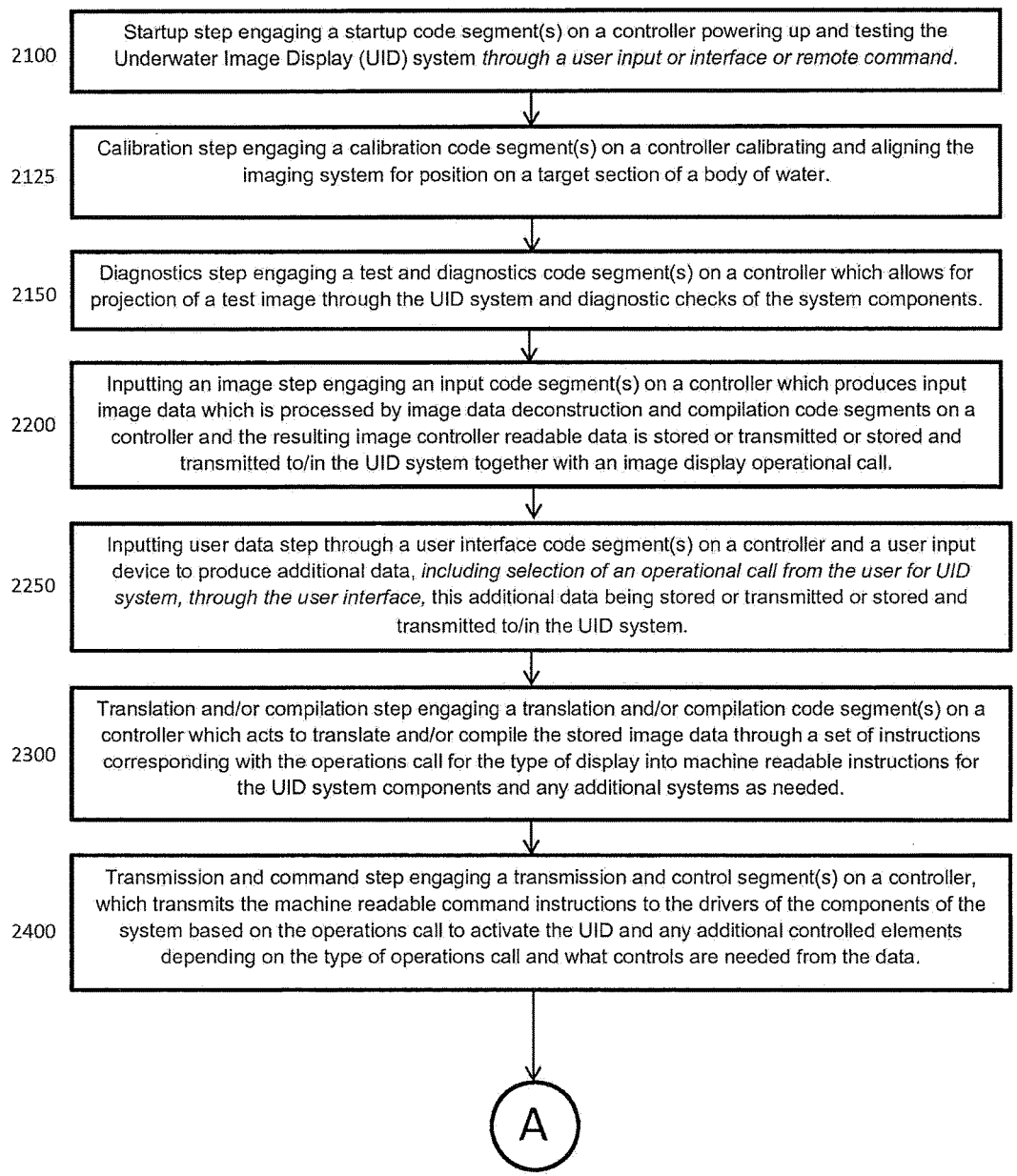
FIGS. 5B and 5C show a flowchart of a further exemplary embodiment of the operation of software on an article of manufacture and a method of operating an underwater image display system.
Figure 5C:
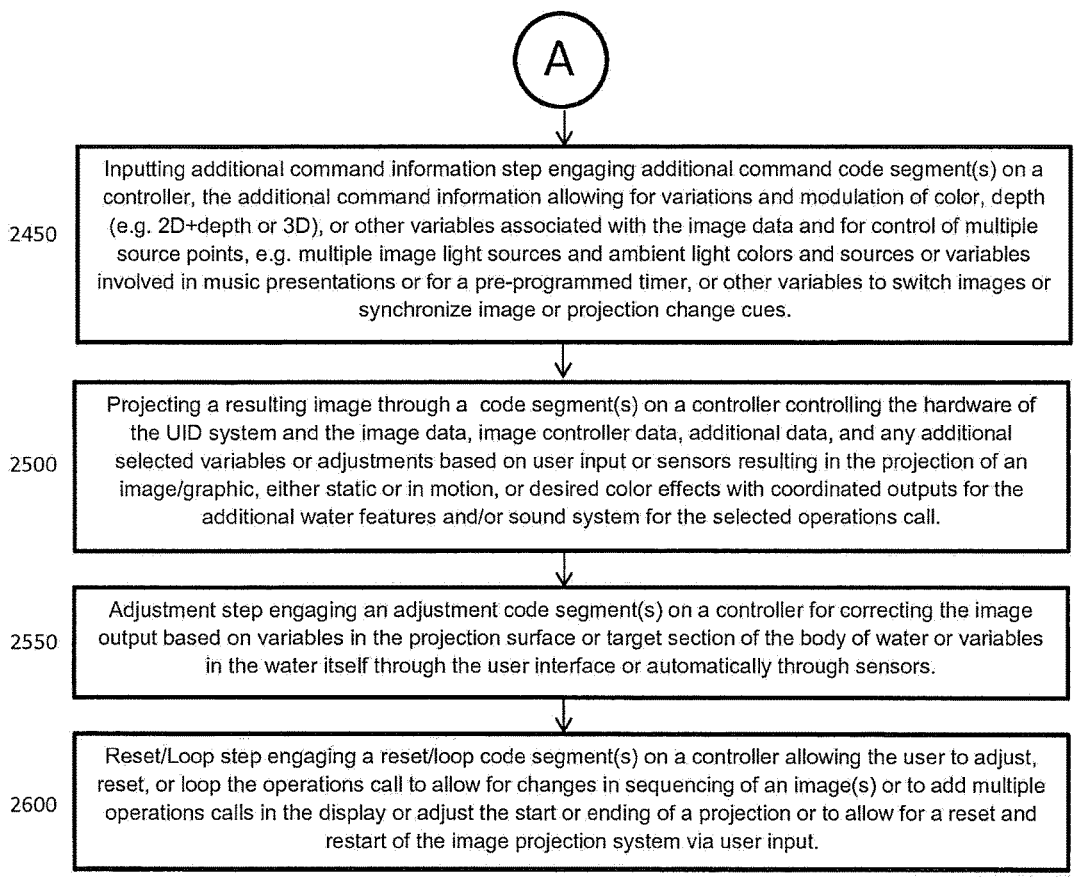

FIG. 5A shows a flowchart for an exemplary embodiment of the operation of software on an article of manufacture and a method of operating an underwater image display system. FIGS. 5B and 5C show a flowchart of a further exemplary embodiment of the operation of software on an article of manufacture and a method of operating an underwater image display system. For the sake of this description, reference is made to the elements of the MEMS device described herein. The method could be utilized with any of the respective embodiments of the at least one image projection device 100 in combination with any of the elements or embodiments discussed or described herein. The method of operation is facilitated through software residing on an electronic device with a controller or computer or interactive controller as discussed above. It is also embodied in the code segments stored on computer readable media. The order of the steps is presented for illustrative purposes only, the order of any particular step may be varied or changed. Additionally, for each step in FIGS. 5A-5C a code segment(s) is specified, indicating one or more code segments, as indicated by the parenthetical. The term one or more has been removed from the figures for the sake of brevity, but is intended.

The method of operation starts with a code segment for powering up and testing the system 2100. The startup step engaging an at least one starting code segment on a controller powering up and testing the Underwater Image Display (UID) system. This can be initiated through a user input or interface or remote command. The system, as shown and discussed, has a power input and power management system 610 and a zero cross detect circuit 620 for power modulation. The user interface controller 50 provides inputs to the system controller 200 as shown and a startup command is sent when the user begins operations in step 2100.

A calibration step 2125 is shown in the embodiment of FIG. 5B and may be run to calibrate and center for position on a target section 1010 of the body of water 7. The calibration step engaging an at least one calibration code segment on a controller calibrating and aligning the imaging system for position on a target section of a body of water. A test point may be projected from the at least one image light source 102 through the beam steering or modulation device 150 and adjusted through inputs and software on the user interface controller 50 and/or software on the system controller 200 in step 2125 for instance. A further diagnostics step engaging an at least one test and diagnostics code segment on a controller which allows for projection of a test image through the UID system and diagnostic checks of the system components is provided for at step 2150.

In the embodiments of both FIGS. 5A and 5B, the step of inputting an image step engaging an at least one input code segment on a controller which produces input image data which is processed by an at least one image data deconstruction and compilation code segment on a controller and the resulting image controller readable data is stored or transmitted or stored and transmitted to/in the UID system. In FIG. 5A, this is done together with an image display operational call. In FIG. 5B, as described below, a further step is provided through a user interface. An image 1020 is input to the user interface, in a manner as substantially described herein in relation to the device embodiments, to produce input image data 1100. This can be done in any manner indicated, in this instance it is provided to the user interface controller 50 and stored there and communicated through the RS-485 communications line to the system controller 200 in method step 2250 as described herein below. The image data 1100 is deconstructed or translated and compiled in step 2300 and the resulting data stored in the memory 210 of the system controller 200.

In FIG. 5B, the step of inputting user data through an at least one user interface code segment(s) on a controller and a user input device to produce additional data is provided 2250. This can include but is not limited to selection of an operational call from the user for UID system through the user interface. This additional data being stored or transmitted or stored and transmitted to/in the UID system. The additional data, including the selection of an operational call, in step 2250 can be made for instance, but is certainly not limited to being made, from the user interface 50 and this data can likewise transmitted to the system controller 200.

In step 2300, a translation and/or compilation step engaging an at least one translation and/or compilation code segment on a controller which acts to translate and/or compile the stored image data through a set of instructions corresponding with the operations call for the type of display into machine readable instructions for the UID system components and any additional systems as needed is provided. The at least one code segments of software on the system controller 200 translate the stored image data 1100 through a set of instructions corresponding with the operational call selected. As noted above, operational calls can include for example, but are certainly not limited to, projection of a moving image with image and non-image light control, projection of static images individually or in series with image and non-image light control, projection of colors or shapes with image and non-image light control, control of just non-image lights, projection and control of the image and non-image light control in conjunction with additional water features and/or a sound system, or similar structured shows or output.

Figure 6:
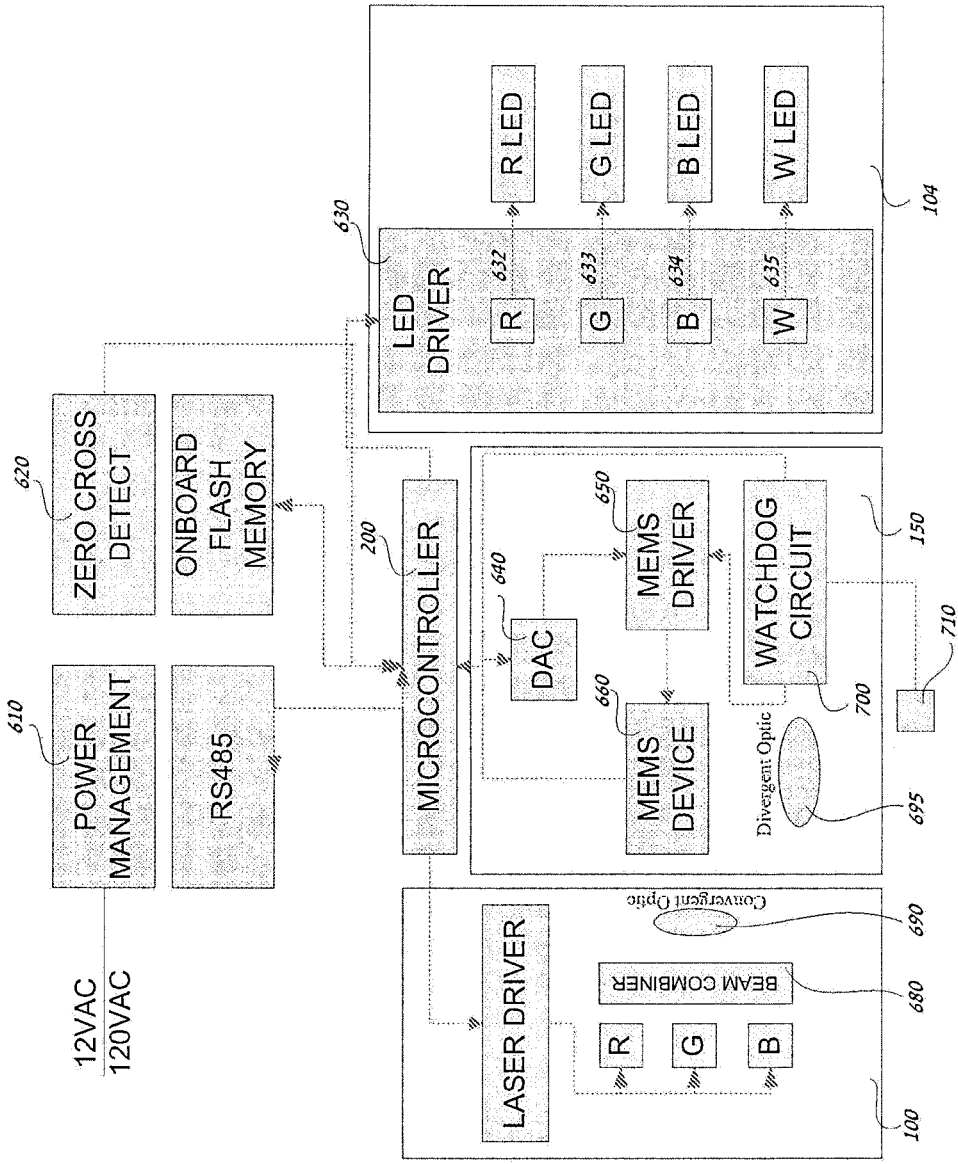
FIG. 6 shows a system block diagram of a further exemplary embodiment of the instant invention.

In step 2400 of the exemplary method shown, a transmission and command step engaging an at least one transmission and control segment on a controller transmits the machine readable command instructions to the drivers of the components of the UID system based on the operations call to activate the UID and any additional controlled elements depending on the type of operations call and what controls are needed from the data. In a non-limiting example relating to the exemplary embodiment of the devices of the instant invention, the system controller 200 would send out command instructions to the drivers based on the selected operations call made at the user interface controller 50 to activate the image display 100 and any additional controlled elements, as shown in the further FIGS. 4 and 14. For example, but certainly not limited to, depending on the type of call and what controls are needed, as shown in FIG. 6 instructions from the system controller 200 can then flow to the laser driver 670, the MEMs device driver 650, the LED driver 630 and any additional light sources, water features, and/or sound system and the respective controllers through the RS485 communications link or a wireless link. The at least one image light source 100, here for instance lasers 672, 674, 676 are engaged and the at least one beam/line/projected light source steering device 150, here a MEMs device 660 with optics 690, 695, steers the beam to produce the desired images with or without motion.

An additional input step is provided in FIG. 5C. The step of inputting additional command information by engaging additional command code segment(s) on a controller is provided at 2450. The additional command information allowing for variations and modulation of, for example but certainly not limited to, color, depth (e.g. 2D+depth or 3D), or other variables associated with the image data and for control of multiple source points, e.g. multiple image light sources and ambient light colors and sources or variables involved in music presentations or for a pre-programmed timer, or other variables to switch images or synchronize image or projection change cues. These can be communicated or stored numeric variables, for instance, the values can be computed from the red-green-blue (RGB) values or through other chromatic representations of the color space are possible, for example: monochrome; hue-saturation value (HSV); YUV, which is a color model used for encoding video; cyan-magenta-yellow (CYN); and cyan-magenta-yellow-black (CYNb.). These in turn can include additional data points based on any available compression or data representations for variables in conventional imaging as additional command information. The additional command information can also be interpreted and communicated by the system controller 200 to the respective components. The additional data may include variables involved in music presentations or for a pre-programmed timer, or other variables to switch images or synchronize image or projection change cues in step 2300.

Per the image data 1100 and the operations call selection, made in step 2200 or 2250, an at least one of the image projection element, the non-image projection lighting, and the additional water features and/or sound system would be operated to display the resulting image 1000 or desired color effects with coordinated outputs for the additional water features and/or sound system for the selected operations call. Step 2500 provides the step of projecting a resulting image through an at least one code segment on a controller controlling the hardware of the UID system and the image data, image controller data, additional data, and any additional selected variables or adjustments based on user input or sensors resulting in the projection of an image/graphic, either static or in motion, or desired color effects with coordinated outputs for the additional water features and/or sound system for the selected operations call.

As noted above with respect to the flow chart of FIG. 4, an adjustment method may be provided for correcting the image output based on variables in the projection surface or target section 1010 of the body of water 7 or variables in the water itself. The method 2550 is substantially the same as that described above in relation to FIG. 4 and as further described herein. An adjustment step 2550 engages an at least one adjustment code segment on a controller for correcting the image output based on variables in the projection surface or target section of the body of water or variables in the water itself through the user interface or automatically through sensors. The adjustment may also provide, but is not limited to, adjustments through a user controller to manipulate the resulting image to compensate for display area/portion contours and other variables in the body of water.

In a final step, a reset or loop step engaging an at least one reset/loop code segment(s) on a controller allows the user to adjust, reset, or loop the operations call to allow for changes in sequencing of an image(s) or to add multiple operations calls in the display or adjust the start or ending of a projection or to allow for a reset and restart of the image projection system via user input. The software on the user interface can for instance allow for adjustment of the operations call to allow for changes in sequencing of an image or the start or ending of a projection or to allow for a reset and restart of the image projection system in step 2600.

Thus, in this instance, the additional exemplary embodiment receives a user inputted image 1020, communicates it to the underwater image projection display system 10 as image data 1100 and through user interface 50 selections of an operating call or show are made by the user to provide the desired projection or display of moving or static images or a projected light show with non-projected light control alone or together with additional water features and/or a sound system display.

FIG. 6 shows a functional plan view of the system controller and the system components in an exemplary embodiment. The system controller 200 is provided and is coupled to and communicates with the system components. A 12 VAC or 120 VAC power input is provided to a power management subsystem 610. The power management system is in communication with a zero cross detect circuit 620 to provide for modulation detection in the case of using such modulation as a control input. The system controller 200 is coupled to on board memory storage 210. The system controller 200 is also provided with on board wired 40 or wireless communications 45, in this instance an RS485 input. This provides communication with a user interface controller 50 or a master controller 80, as shown for instance in FIGS. 10-12 below, or with additional elements, such as additional water elements or sound systems, or the like.

The system controller 200 can also control the at least one ambient or non-image projection light source 104. In the instant embodiment this is provided through an LED driver 630 driving three high output LEDs, one red 632, one green 633, one blue 634. The ambient light is controlled both as a function of the programmed image display software, using it in conjunction with the image projection device, and as a component of simply controlling the ambient light exclusive of the image display device. An at least one light level sensor 48 is coupled to the controller 200. The light level sensor 48 allows for automatic sensing of an ambient light level in the body of water 7 and can be a single sensor or an array of sensors and can include sensing from other systems outside of the lighting systems of the body of water 7. The output of the at least one light sensor 48 can also be incorporated in the operation of the underwater image projection display system 10. Two non-limiting examples of its use include establishing levels for the ambient lighting 104 in the image projection display system 10 and for turning the image projection display system 10 and/or additional lighting on and off with the sunset or sunrise.

In the exemplary embodiment shown, the system controller 200 is coupled to and communicates with an image projection device 10 and the image projection element 100. In this exemplary embodiment, the image projection element 100 is the set of lasers; the three discrete color laser lights are the image light source 102 in the image display device 100. In this case the laser driver 670 controls a red laser source 672, a green laser source 674, and a blue laser light source 676. These are then passed to a beam combiner 680 which sends the laser light sources 672, 674, 676 through the beam collimator to a converging optic 690. The converging optic 690 then passes the emitted light to a micro-electric machine (MEMs) Device 660. The MEMs device 660 comprises a grid of nano or pico mirror elements controlled by the MEMs driver 650 to steer an image light source, in this instance the combined laser beam or a similar micro-electrical mechanical device. The MEMs driver 650 is coupled through a digital to analog converter 640 to the system controller 200. After reflecting the light from the MEMs device 660, the reflected light begins to paint an image 1000 by passing through a divergence optic 695 to the targeted portion 1010 of the body of water 7.

An additional watchdog circuit is provided to add measure of safety in operating the laser of the exemplary embodiment. A sensor 710 measures optical intensity of the emitted light and communicates to the watchdog circuit 700. The watchdog circuit 700 communicates with the laser driver 670 and the MEMs device 660 communicates its operational status with the watchdog circuit 700. If either the sensor 710 input or the MEMs device 660 input is abnormal, indicating a malfunction in the laser or the steering device, the watchdog circuit 700 shuts down the laser driver 670 through its coupling 720 which shuts down the laser light sources 672, 674, 676 to protect any user from having the laser light freeze in place and potentially cause harm.

Thus, the system controller 200 in the exemplary embodiment shown provides control of ambient or non-image lighting in conjunction with an image light source, in the embodiment shown as several lasers, or separately without the image light source to provide a pleasing display of static or moving images underwater in a body of water 7.

Figure 7A:
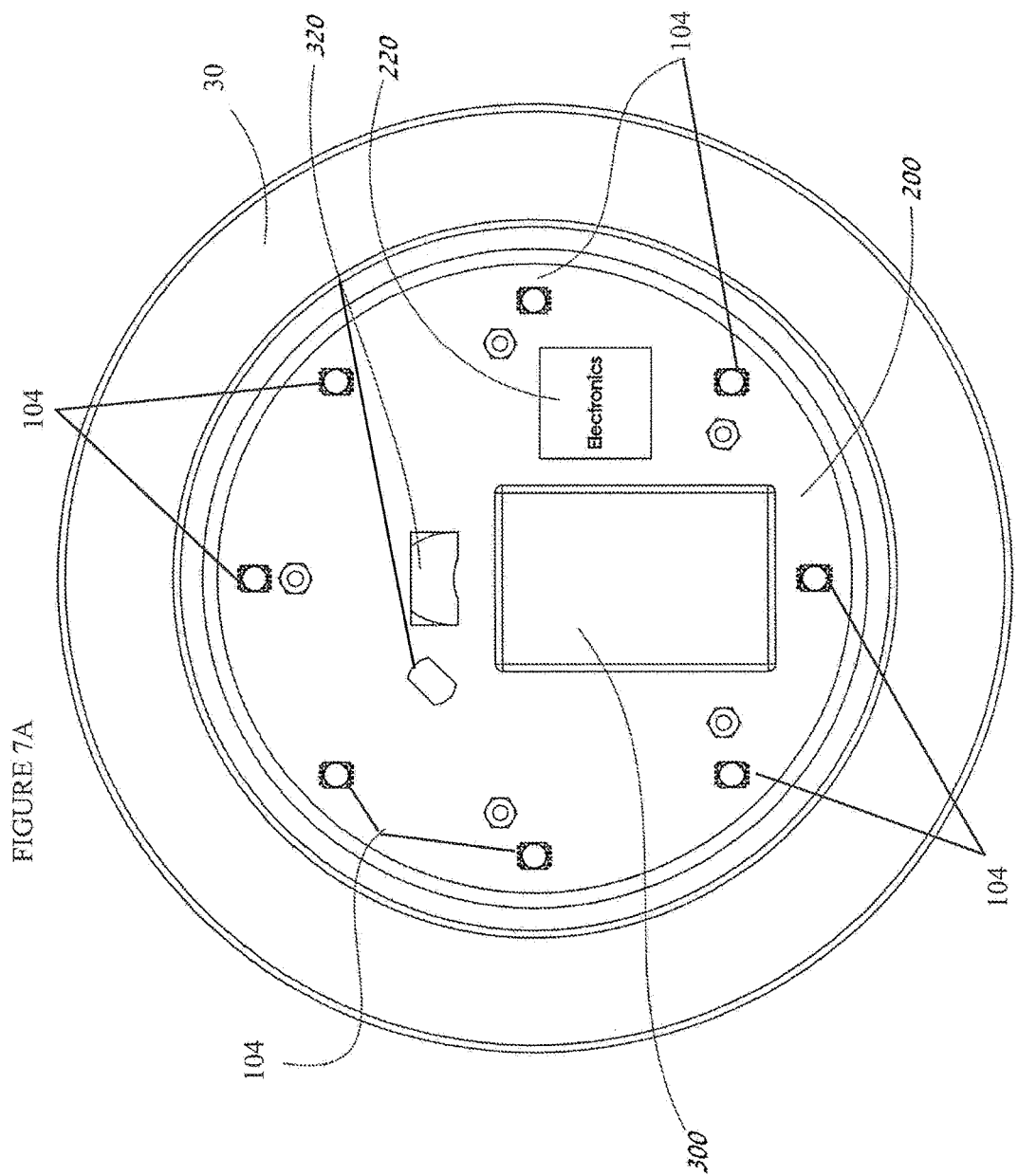
FIG. 7A shows a front view of a further exemplary embodiment of the instant invention utilizing an underwater projector as installed in the body of water.
Figure 7B:
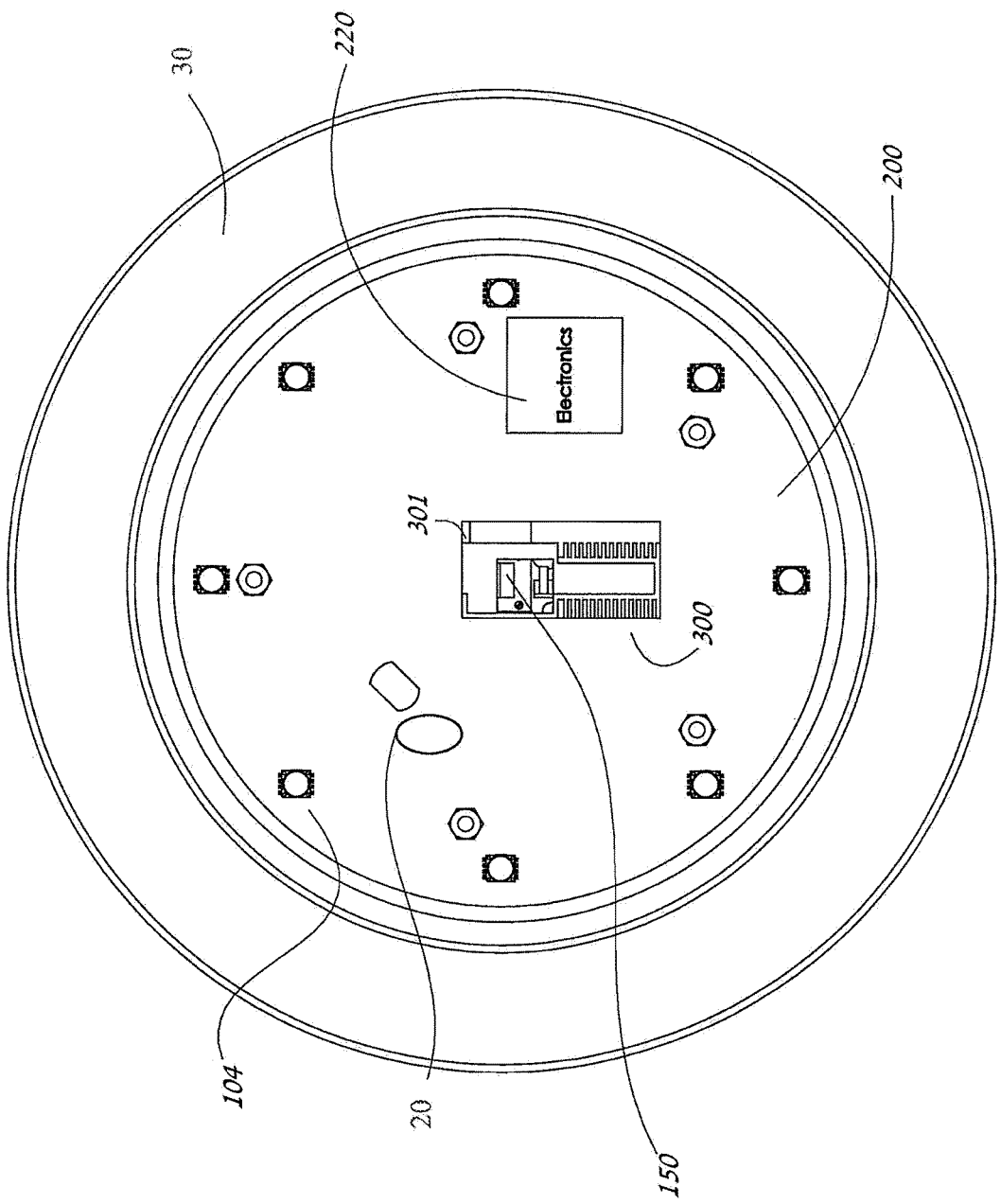
FIG. 7B shows a front view of a further exemplary embodiment of the instant invention utilizing an underwater projector with a laser light source device as installed in the body of water.
Figure 8A:
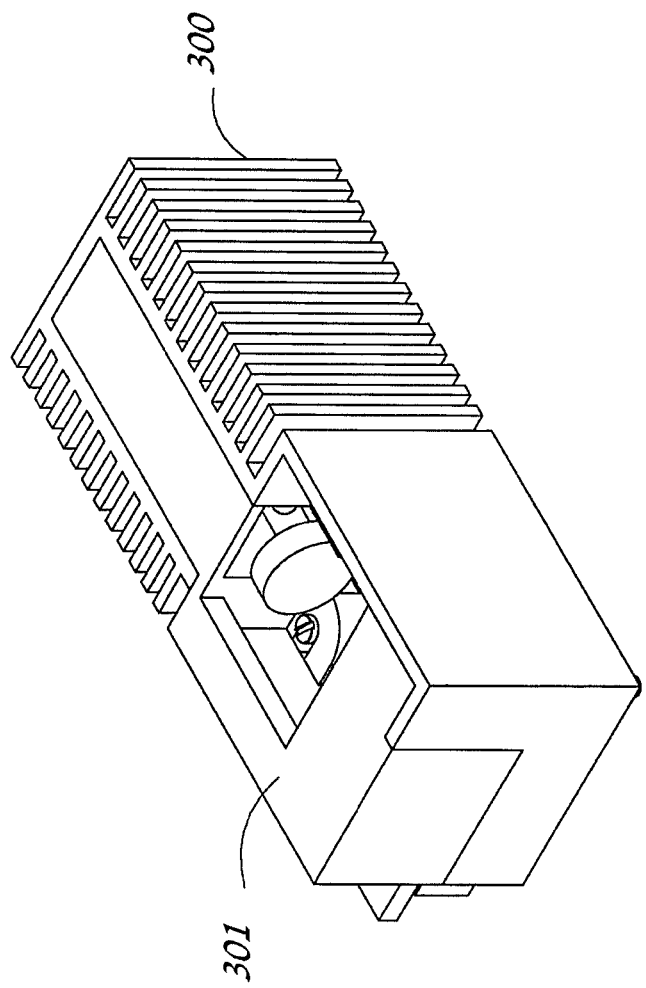
FIG. 8A shows an isometric view of a projection device using a laser.

FIGS. 7A and 7B show front views of a further exemplary embodiment of the instant invention utilizing a MEMs device and a Laser Device as installed in the body of water. FIG. 7A, as noted above in FIG. 6, provides as a non-limiting example a MEMS device which may be utilized as the at least one image projection element 100 and steering or modulation device 150 as shown. The at least one image projection element or device 100 and the projected light source 102 are combined in the MEMs device 300 and enclosed therein with a HS on the exterior to provide for heat dissipation, as best seen in FIG. 8A. The MEMS device 300 is coupled to an electronics section 200 internally with an additional electronics section 220 controlling the MEMS device 300. As best seen in FIG. 6, the projection element 100 has an at least one image projection or projecting light source 102, here three diode lasers in red 372, blue 374, and green 376 respectively. An at least one additional or further optic 320 is also provided in FIG. 7A. The at least one further or additional optic is shows as an additional mirror used to steer the projected image 1000. The is in addition to the at least one beam/line/projected light source steering or modulation device 150 that is coupled to an electronics section 200 within the MEMs device 300 as shown in FIGS. 6 and 7A. This section can include for instance the controller for the MEMS device, software for driving same, controllers for the laser drivers, and similar software and/or hardware. The electronics section 220 is a component of the systems controller 200 and provides localized control of the MEMS device as a part of the system controller 200. A series of ambient or non-projection light elements 104 are also provided around the system.

FIG. 7B shows a front view of a further exemplary embodiment of the instant invention utilizing a culminated light device. Similar to the device FIG. 3, a projected light source 102 is provided with at least one beam steering device 150, which in this case includes both pitch and yaw steering devices for instance galvanometers that may be utilized as the at least one projected light source steering or modulation device, these elements being contained in the projection device 300 and enclosed therein with a HS on the exterior to provide for heat dissipation. The projection device 300 is coupled to an electronics section 200 internally with an additional electronics section 220 controlling the MEMS device 300. An at least one additional or further optic or steering device 320 is also provided as in FIG. 7A. In this instance, the at least one further or additional optic is shown as an additional mirror used to steer the projected image 1000. This is in addition to the at least one culminated light or beam/line/projected light source steering or modulation device 150 that is coupled to the electronics section 200 and the further electronics section 220. This further electronics section 220 can include for instance, but is certainly not limited to, the controller for the at least one beam/line/projected light source steering device 150, software for driving same, controllers for the laser drivers, and similar software and/or hardware. A series of ambient or non-projection light elements 104 are also provided around the system.

Figure 7C:
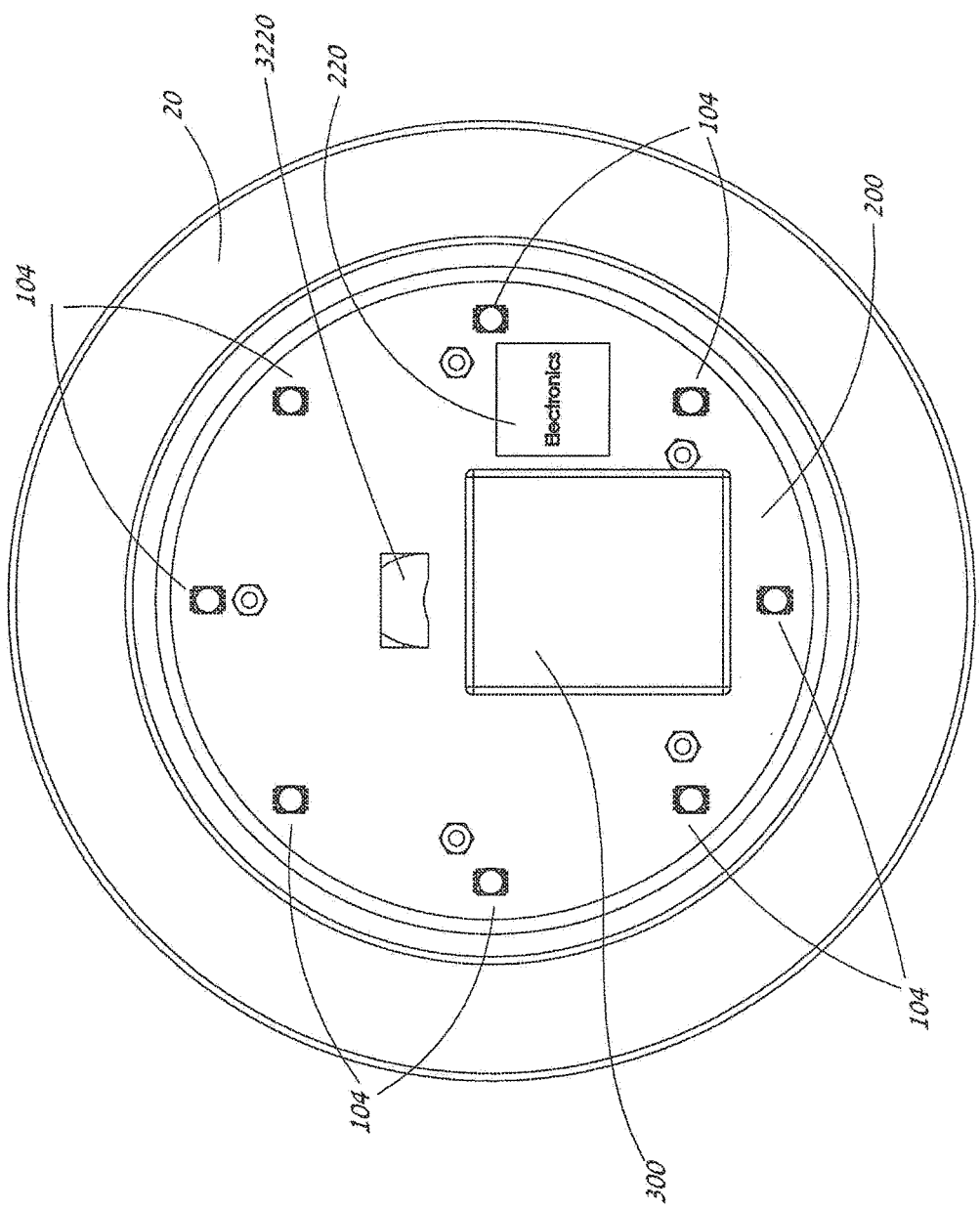
FIG. 7C shows a front view of a further exemplary embodiment of the instant invention utilizing an underwater projector and a further steering device as installed in the body of water.

FIG. 7C shows a front view of yet a further exemplary embodiment of the instant invention utilizing a MEMs device and further image steering mechanism. As noted above, a MEMS device may be utilized as the at least one projected light source steering or modulation device 150 as shown. The at least one image projection element or device 100 and the projected light source 102 are combined in the MEMs device 300 and enclosed therein with a HS on the exterior to provide for heat dissipation. The MEMS device 300 is coupled to an electronics section 200 internally with an additional electronics section 220 controlling the MEMS device 300. The MEMs device 300 may include LASER light sources or can include any of the other light source types provided herein. As best seen in FIG. 6, the projection element 100 has an at least one image projection or projecting light source 102, here three diode lasers in red 372, blue 374, and green 376 respectively. An at least one additional optic with steering device 3220 is also provided as in FIG. 7A. In this instance, the at least one further or additional optic is shown as an additional mirror that is articulated and used to steer the projected image 1000. This is in addition to the at least one beam/line/projected light source steering or modulation device 150 that is coupled to an electronics sections 200, 220 within the MEMs device 300 as shown in FIGS. 6 and 7A. This section can include for instance the controller for the MEMS device, software for driving same, controllers for the laser drivers, and similar software and/or hardware. The electronics section 220 is a component of the systems controller 200 and provides localized control of the MEMS device and the additional optic with steering device 3220 as a part of the system controller 200. A series of ambient or non-projection light elements 104 are also provided around the system.

FIGS. 7D and 7E show a front and a cross-sectional view, respectively, of a further exemplary embodiment of the instant invention using a MEMs device and a further image steering mechanism. In the cross-sectional view, the image projection system 10 is again a MEMs device similar to the embodiment shown in FIG. 7A, though any of the previously mentioned image sources/projected image steering systems could be employed. The embodiment had additional LED ambient light sources 104, a lens body 90, a frame or enclosure 30. In this instance the ambient light sources 104 move with the enclosure 30, however, these light sources may also be located on a stationary portion of the enclosure or otherwise isolated from movement.

In this exemplary embodiment, the enclosure 30 includes a tilting device with two axis for rotation of the device. The two axis being represented by two threaded rods coupled to motors acting as a further image steering element 3220. The two rod elements 36, 38 are used as the at least one further image steering device 3220 allows for translation of the entire underwater image display system 10 to be moved and thereby move the projected image 1000. This would function at the point of installation, where the tilting mechanism would provide both pitch and yaw control of the underwater image display system, as seen in FIG. 7E. The pitch or yaw motions are provided by an at least one motor, here two motors 151, 153 coupled to the rod elements 36, 38 which can move independently or in coordination one another. A third axis of motion could easily be provided, a twisting or similar motion about the outside perimeter of the device. The rod elements 36, 38 are engaged between the bottom of the enclosure and a further plate 39 with a flexible mount 33 there between. By moving the rod elements 36, 38 the enclosure may tilt and in the process move the image projection device, here a MEMs device 300.

Additional mechanisms may also be used to move the full enclosure 30 of the instant invention to provide motion in the projected image. For instance, a gimbal in gamble setup would permit easily controlled movements or ball joint/socket or similar devices. These other devices may also utilize a single motor and are fully embraced herein; similarly the further image steering device 3200 may also encompass a single faceted ball moving in at least two axis or a single drive motor with a more complicated transmission driving a similar gimbal. A printed circuit board is provided and the electronics section 220, image projection device 100, here again a MEMs based device acting both as the projected light source and as the first, and an ambient light source 104, a projected light source steering device are all shown in the embodiment of FIG. 7C.

Figure 8B:
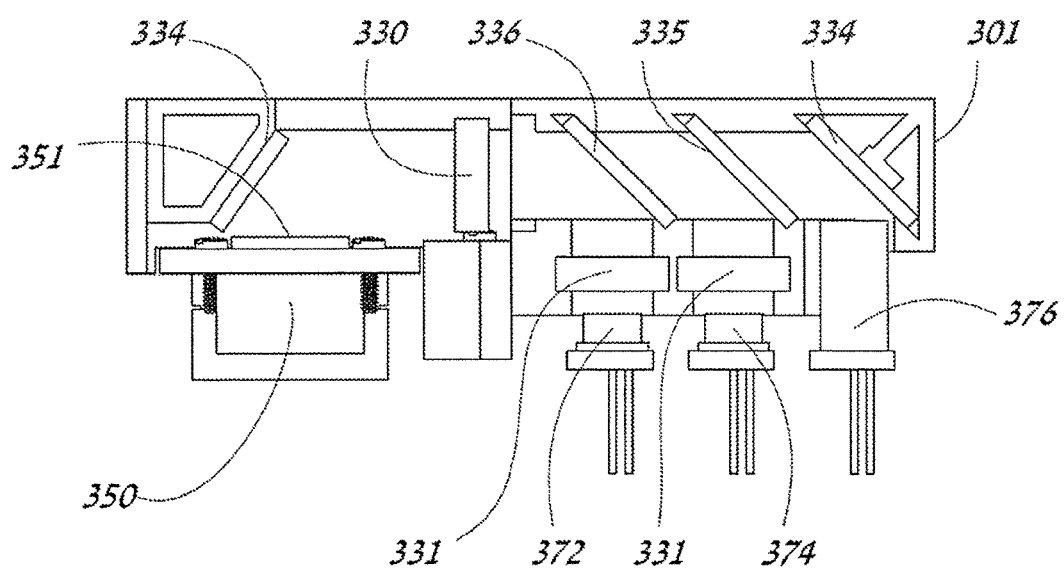
FIG. 8B shows a further cross section of an exemplary embodiment of the instant invention.

FIGS. 8A and 8B show an isometric and a cross-sectional view of another exemplary embodiment of an image projection device used in the embodiment of the instant invention. The isometric view of FIG. 8A shows the exterior of the at least one beam/line/projected light source steering device, having a heat sink 300 and a frame 301. The cross-sectional view shows the details of this exemplary embodiment of a MEMS device having a set of driven lasers being utilized as the at least one beam/line/projected light source steering device 150. The cross-sectional view in FIG. 8B shows the at least one image projection or projecting light source 102 is shown as three diode lasers, red, blue, and green 372, 374, 376, respectively. These are coupled to the power source (not shown) and controlled via a laser driver 670 in the electronics section 220. The light emitted by the red and blue 372, 374 diode lasers are reflected from a collimator optic 331 to produce a low divergence beam. The green diode laser 376 in this case, but is not certainly limited to, has a building collimator in the laser. The green laser light is redirected by reflector 334. The red and blue beams are selectively deflected from dichroic reflectors. Dichroic reflector 335 reflects blue and passes green light wavelengths. Dichroic reflector 336 reflects red and passes green and blue wavelengths. The redirected light is passed through a convergence optic 330 and the resulting beam is redirected by a mirror 351 onto the MEMS microchip 350. The MEMS microchip 350 has a two axis mirror array 351 on it and the image source is projected in a controlled fashion therefrom. In this instance, the system controller 200 or the electronics section 220 which can communicate with the system controller 200 and the master controller 50, controls the emanations of the MEMS device which is being utilized as the at least one beam/line/projected light source steering device in any fashion, for instance in the methods described herein.

Figure 9A:
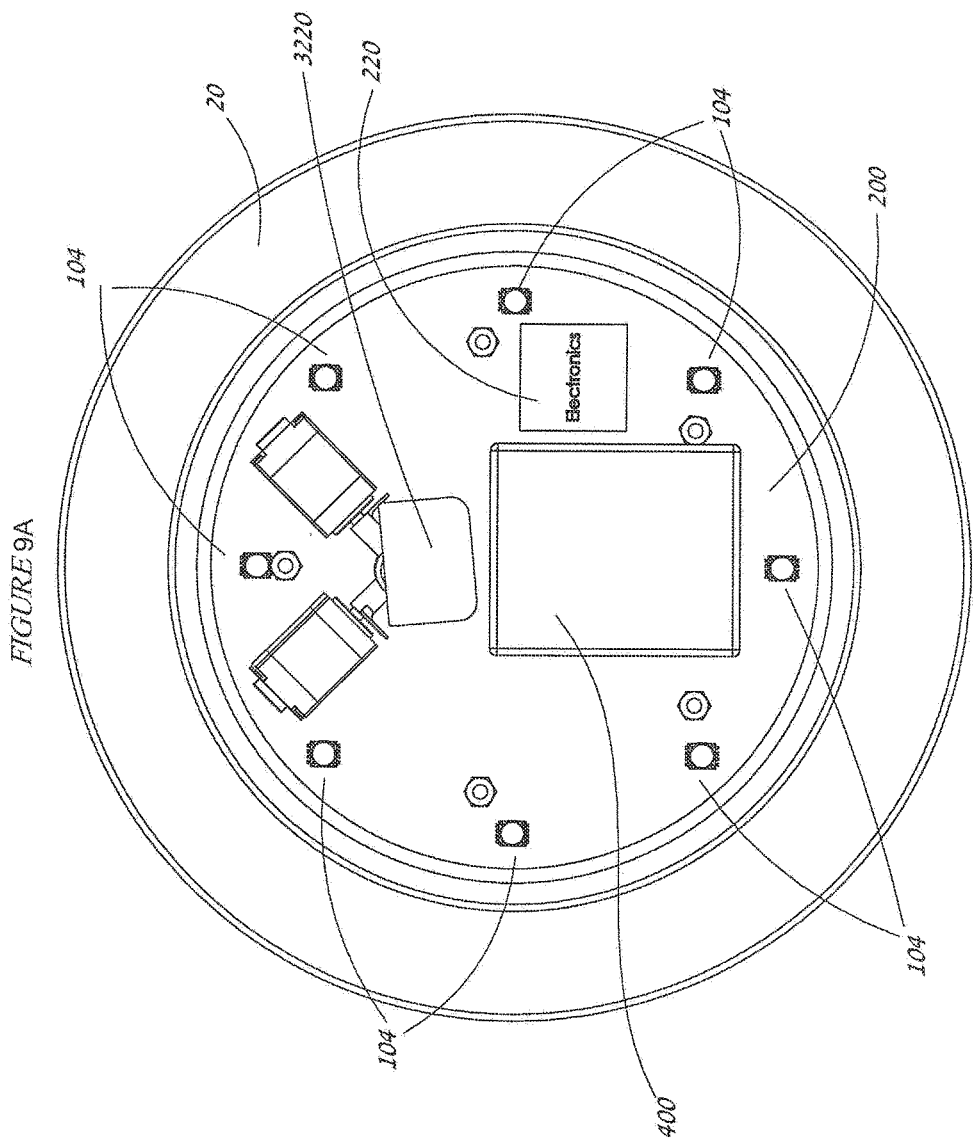
FIG. 9A shows a front view of an exemplary embodiment of the instant invention using a DMD as a projection source.

FIG. 9A shows a further exemplary embodiment of the instant invention as installed in a standard niche in a water body. The embodiment of FIG. 9B produces an image 1000 utilizing a projection light source 102 and at least one steering device 150 in one unit, here a DMD image projection source and image steering device 400. The non-limiting exemplary embodiment uses, but is not limited to, a similar circular shaped body or enclosure or frame member 30 as that seen in FIGS. 7A-7E. Coupled to the frame member 30 is an optional at least one ambient light, here a set of ambient HBLED lights, 104. An electronics package 220 enables communication with the at least one image projection device, here the DMD projector 400. A further image steering mechanism 3220 is provided which provides the ability to move the image 1000 around the pool for optimal viewing on the typically irregular pool sides and/or bottom 2, 5. In operation, the DMD Projection system 400 utilizes an at least one image light source 104, in this instance multiple HBLEDs, which are projected onto an image steering device 150, in this instance a micro mirror array on a silicon chip, a controller in the DMD projection system acts as the systems controller 200. The at least one image light source, the multiple HBLEDs, project the image through the system. The operation of a DMD based LED projection mechanism is known and the specific details are not covered here. However, as a brief overview summary, the incident light is reflected off the micro mirror array or to an image dump, e.g. not reflected as a part of the image, resulting in a full color image projection.

The at least one further image steering device 3220 is shown here as a two axis movable reflective element or mirror. Further embodiments may utilize, for instance but certainly not limited to, an at least one single axis mirror, a galvanometer, an electric pitch motor, an electric yaw motor or the like. The at least one further image steering device may effect steering through adjustment of an image reflective element or may simply move the entire light body or frame, for instance having a further frame member coupled to the frame member 30 as depicted in FIG. 7C. In this instance the further frame member, like that noted in FIG. 7C above, would have a similar DMD projection element stationary on the printed circuit board 200 and the printed circuit board 200 would be moved with the frame member 30. In addition, in the exemplary embodiment shown, the further image steering device 3220 alone or in conjunction with the image steering device 150 within the image projection device, here the DMD projection device 400 provides the ability to adjust at least one image parameter to an at least one pool variable. For instance, the image source steering device 150, here the micro mirror array within the DMD projection device 400, in conjunction with the at least one further image steering device 3220 can provide skew controls to accommodate the non-uniform surface of the pool bottom 2 or sides 5, as shown in FIGS. 1-2 and 10-13.

In a particular exemplary embodiment, the system controller (not shown) within the DMD projection device 400 further comprises an additional controller or electronics section 220 with software that is "trained" or setup by a user to provide skew movement values for test projection image (s) 1000. The additional controller communicates with the image source steering device 150 and the further image steering device 3220. Based on this input, the software through adjustment with either the image source steering device 150 alone or in combination with the further image steering device 3220 provides a programmed variance for moving the projected image around the pool while adjusting the parameters of the resulting image to maintain the viewed image throughout the non-uniform projection surfaces of the water feature. This allows for full, simulated motion of an image throughout the pool with minimal distortion. The result is near photorealistic images and motion throughout the pool of an animated image.

Figure 9B:
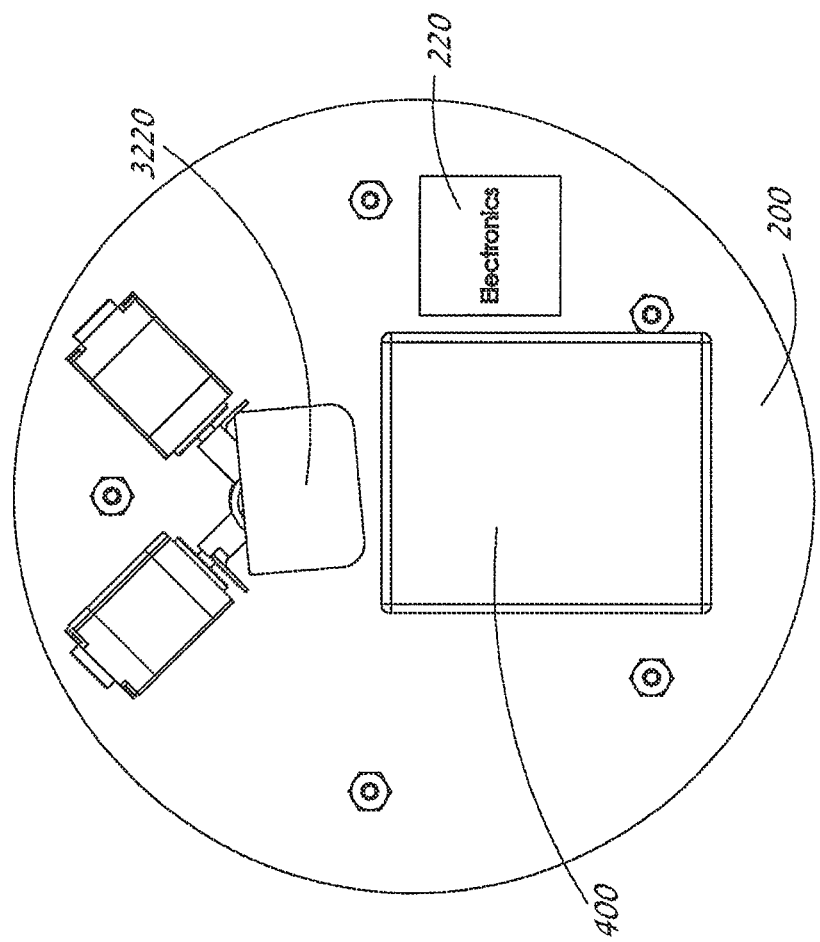
FIG. 9B shows a further exemplary embodiment of the instant invention utilizing a DMD in a small form factor.

FIG. 9B shows a further exemplary embodiment of the instant invention utilizing a DMD in a small form factor. Similar to FIG. 9A, the embodiment of FIG. 9B produces an image 1000 utilizing a projection light source 102 and at least one steering device 150 in one unit, again here a DMD image projection source 400, though other technologies providing the combination of the functions of projecting the image light source and the steering function in a compact unit could also be utilized in the exemplary embodiment shown in FIG. 9B. These include but are certainly not limited to LCOS, LCD, DMD, hybrid and laser projection systems, spatial light modulation systems, and the like. The embodiment depicted has a smaller frame or body member 30 without any of the at least one ambient lighting elements 104 shown in FIG. 8. The embodiment of FIG. 9B utilizes a further image steering device 3220, here shown as a multi-axis mirror. The combined at least one steering device in the DMD image projection device 400 is used, as above. The smaller footprint afforded the embodiment of FIG. 9B fits smaller form factors in various water features and shows the instant invention without ambient lighting elements having a smaller overall diameter and smaller frame portion.

Figure 10:
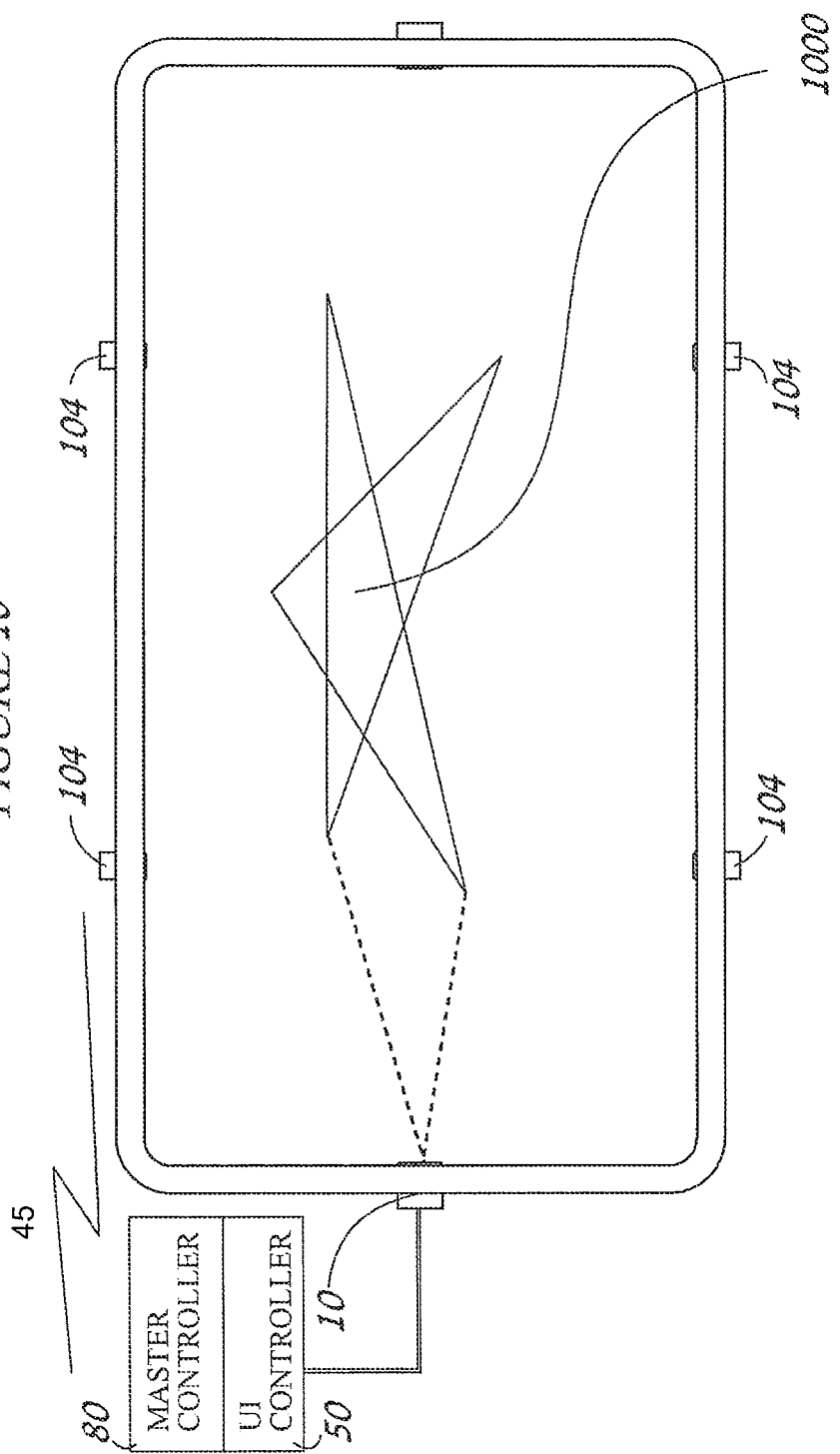
FIG. 10 shows a still further embodiment of the instant invention having multiple non-imaging light sources.

FIG. 10 shows a still further embodiment of the instant invention having multiple non-imaging light sources. The further exemplary embodiment provides for multiple ambient light sources 104 indicated in positions throughout the body of water 7. Here the body of water 7 is a pool with several ambient or non-image projecting light sources 104 embedded in its sides and floor. The non-image projecting light sources 104 are coupled to and communicate through wireless connections 45 with a master controller 80 in the user interface controller 50. The master controller 80 and user interface controller 50 are, in this instance, located outside the body of water 7 and coupled to the underwater image projection display system 10 via a wired communications line 40. In operation the further exemplary embodiment shown synchronizes the non-image projecting light sources 104 in conjunction with the image light source 102 of the underwater image projection display system 10. The underwater image projection display system 10 utilizes components and methods similar to those herein described, including the synchronization of the non-image projecting light sources 104 in conjunction with the operational calls and display of image 1000 as shown.

Figure 11:
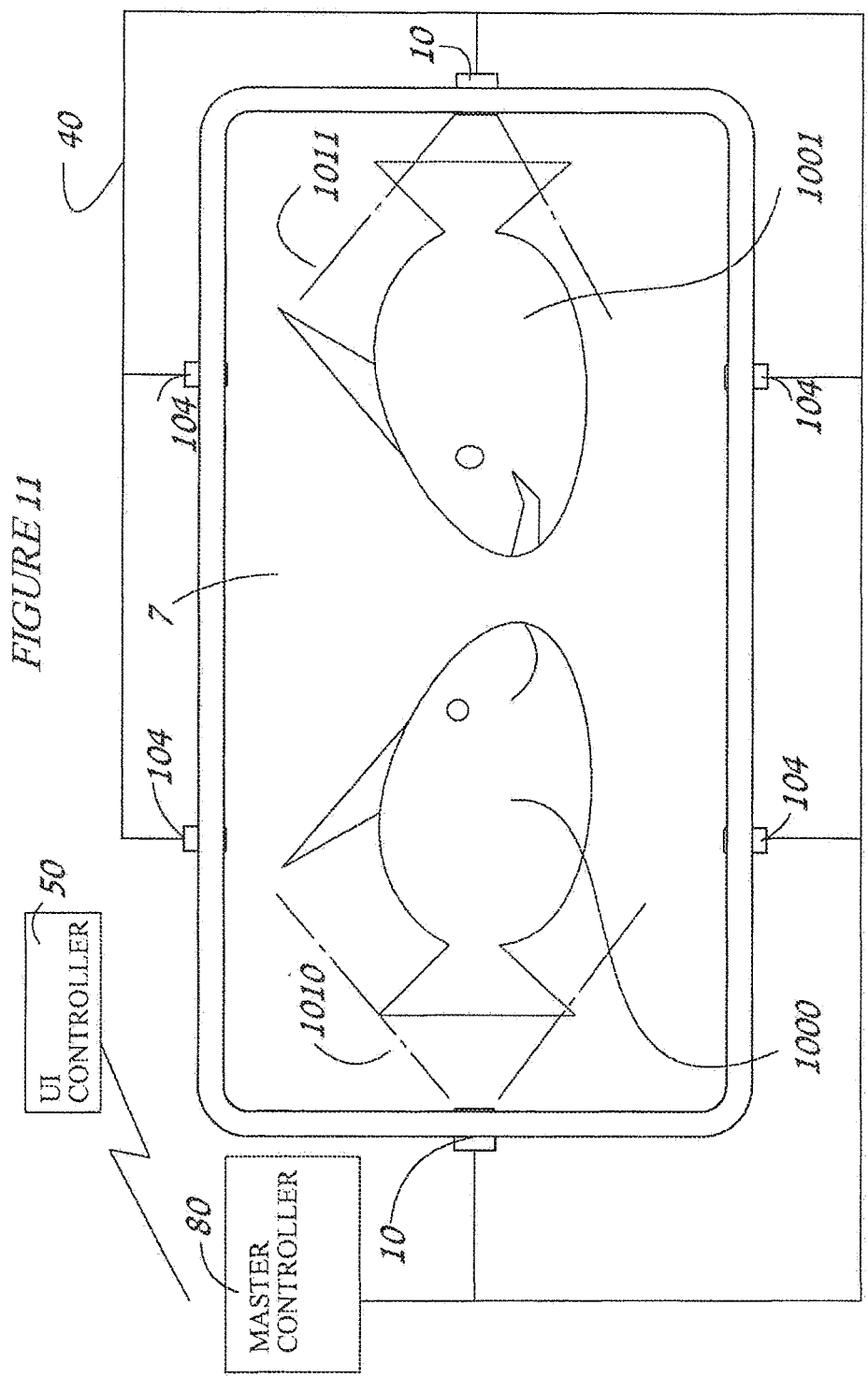
FIG. 11 shows a plan view of yet a further exemplary embodiment of the instant invention having multiple image projection devices and multiple non-imaging light sources.

FIG. 11 shows a plan view of yet a further exemplary embodiment of the instant invention having multiple image projection devices and multiple non-imaging light sources. In the exemplary embodiment shown, a master control system 80 is provided separate and apart from the user interface 50, which is coupled to and communicates with the master control 80 through a wireless connection 45. The master controller 80 communicates through wired connections 40 to multiple non-image projection light sources 104 throughout the body of water 7, here a public fountain display. In addition, multiple image projection systems 10 are provided, each being similar to the previously disclosed image projection systems 10. The multiple projection systems 10 are utilized to display images at multiple target sections 1010, 1011 of the body of water 7. These images 1000, 1001 may be synchronized, may be overlapped, or combined in there displays in any manner desired or may be operated independently of one another. The master controller 80 communicates and synchronizes the display in the manner substantially described herein above, utilizing the user interface 50 to select operations calls for the image projection systems 10 and the non-image projection lighting systems 104, either together or alone.

Figure 12:
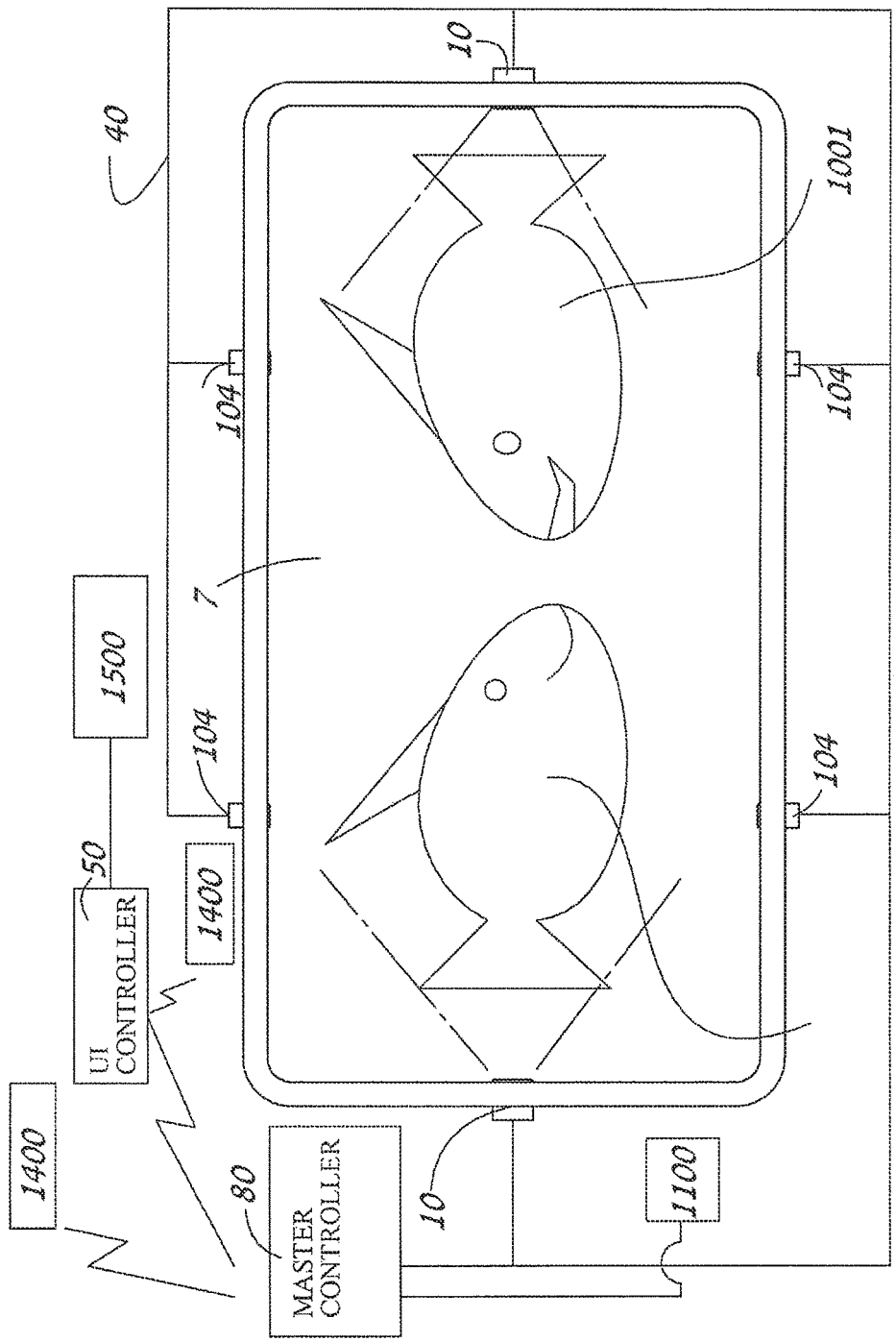
FIG. 12 shows a plan view of a further exemplary embodiment of the instant invention coupled to and communicating with further display elements.

FIG. 12 shows a plan view of a still further exemplary embodiment of the instant invention. The exemplary embodiment shown is similar to that of FIG. 11 above, having a master controller 80 in wireless communication 45 with a user interface controller 50. The master controller 80 is also coupled to and controlling at least two underwater image projection display systems 10 and multiple non-image projection light sources 104 through RS-485 wired connections 40. In addition to the multiple underwater image projection display systems 10 and the non-image projection light sources 104, the master controller 80 is in communication with and synchronizes with additional water elements 1400 and sound systems 1500. The operations calls made in this embodiment include controls for and synchronization of the image projecting systems 10 not only with the non-image projection light sources 104, but also with the additional water elements 1400 and sound system 1500. This can include additional data representing image change cues synchronized to the music and change cues for the output and control of the additional features. As noted, non-limiting examples of these additional features include but certainly are not limited to water features, bubblers, fountains, waterfalls, laminar jets, water effects, accent lights, pool lights, sound systems, boat controls, pyrotechnic controls, pool controls, or similar components.

Figure 13:
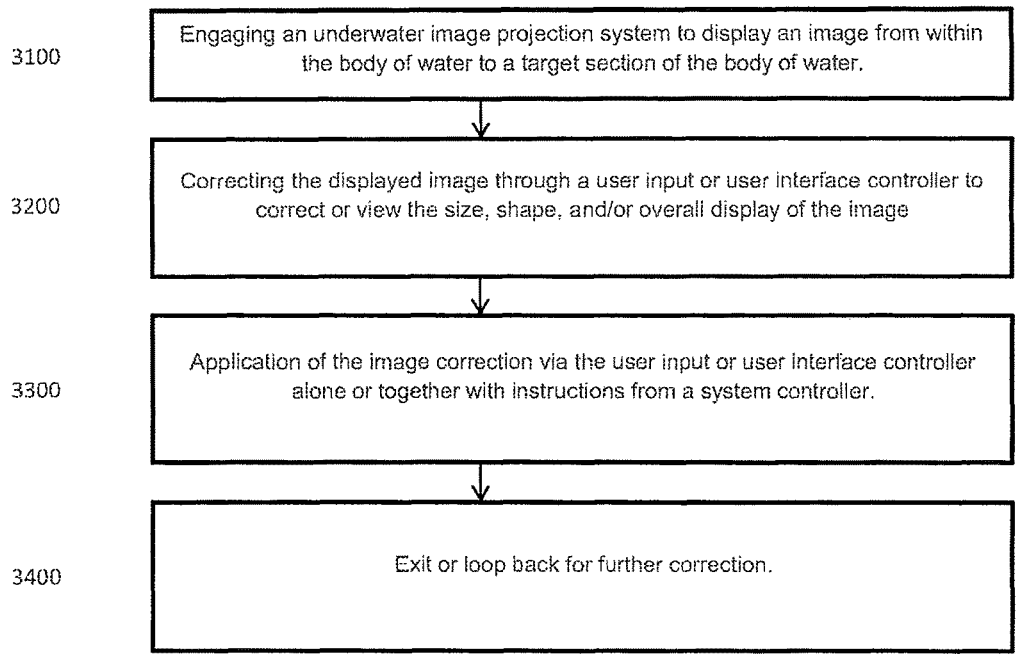
FIG. 13 shows a flowchart of an exemplary embodiment of a method of adjusting an image projected underwater to a point in a body of water to conform to non-uniform display surfaces in the body of water.

FIG. 13 shows a flowchart of an exemplary embodiment of a method of adjusting an image projected underwater to a point in a body of water to conform to non-uniform display surfaces in the body of water. As part of one of the aforementioned exemplary embodiments or alternatively as a part of another underwater projection system, a method for adjusting or correcting the image display is provided. In a first step an underwater image projection system is engaged 3100. The image is displayed from a projector in the body of water on a target section of the body of water. The target section may be non-uniform or the water may interfere with the projection in such a way that it distorts the image. In a second step 3200, a correction is made to the projection of the image. In this instance the correction can be one of any number of mechanisms to adjust the image. This includes skew adjustment, pitch adjustment, pincushioning, aliasing and anti-aliasing, and similar digital adjustment techniques. This may also include adjustment of color, saturation, contrast, or other image qualities or characteristics commensurate with a projected image. These options may be presented to the user via a user interface.

The selected correction is then applied to the image in step 3300. The application of the image correction may be through a user input or user interface controller alone or together with instructions from a system controller. The correction may be applied in a preview and shown in the user interface prior to the application to the projected image. After application of the correction, the method may be exited or looped to review or revise the effect of the correction and if needed a further or additional correction may be made, as seen in step 3400.

The embodiments and examples discussed herein are non-limiting examples. The invention is described in detail with respect to preferred or exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

The invention claimed is:

1. An underwater image projection system submerged in a body of water and projecting an image within the body of water, comprising:
    a submerged projection element with a projecting light source configured to project an image within the body of water;
    a light source steering device configured to direct light from the projecting light source;
    a user interface configured to receive data input from a user including at least one of an input of the image and instructions for displaying the image;
    a controller in communication with the projecting light source, the light source steering device, and the user interface, the controller configured to:
        retrieve the data input from the user interface,
        access image data corresponding to the image, and
        control the projecting light source and the light source steering device to project the
    image onto a target surface within the body of water based on the data input from the user interface; and
    an ambient light source in communication with the controller, wherein the controller is configured to control and move the ambient light source independent from the projecting light source.

2. The underwater image projection system of claim 1, wherein the controller is configured to:
    retrieve additional input related to the projected image on the target surface, and
    adjust one of the projecting light source and the light source steering device to project a corrected image onto the target surface within the body of water based on the additional input.

3. The underwater image projection system of claim 1 and further comprising an image steering element in communication with the controller.

4. The underwater image projection system of claim 3, wherein the controller is configured to control the image steering element to move the projected image.

5. The underwater image projection system of claim 4, wherein the controller is configured to adjust one of the projecting light source and the light source steering device while moving the projected image via the image steering element to minimize distortion caused by movement of the projected image along non-uniform projected surfaces within the body of water.

6. The underwater image projection system of claim 1, wherein the controller further retrieves operations call data and controls the projecting light source and the light source steering device to project the image onto the target surface within the body of water based on the data input and the operations call data.

7. The underwater image projection system of claim 1, wherein the controller is configured to synchronize projecting the image onto the target surface with controlling at least one additional light source, a water feature, and a sound system.

8. The underwater image projection system of claim 1 and further comprising an enclosure, wherein the projecting light source, the light source steering device, and the controller are housed in the enclosure.

9. The underwater image projection system of claim 8, wherein the enclosure is configured to be mounted in a recess within a wall of the body of water.

10. The underwater image projection system of claim 1, wherein the user interface includes a user interface controller, and one of the user interface controller and the controller stores the image data.

11. The underwater image projection system of claim 1, wherein the user interface is located remotely from the submerged projection element.

12. The underwater image projection system of claim 1, wherein the controller is configured to project the image as an animated image.

13. The underwater image projection system of claim 1, wherein the ambient light source is at least one of existing pool lights, after market accent lights, additional lighting, or display elements, such as fountains or bubblers.

14. The underwater image projection system of claim 1, wherein the light source steering device is capable of moving the image around the body of water.

15. The underwater image projection system of claim 1, wherein the submerged projection element includes a grating section.

16. The underwater image projection system of claim 1, further comprising a micro-electric machine comprising a grid of mirror elements controlled by a driver.

17. The underwater image projection system of claim 1, wherein the controller includes at least one driver, an optical intensity sensor, and a watchdog circuit,
wherein the optical intensity sensor is in communication with the watchdog circuit, the watchdog circuit configured to:
shut down the driver when the optical intensity sensor detects a malfunction with the light projected from the projecting light source.

18. An underwater image projection system submerged in a body of water and projecting an image within the body of water, comprising:
a submerged projection element with a projecting light source configured to project an image within the body of water;
a light source steering device configured to direct light from the projecting light source;
a user interface configured to receive data input from a user including at least one of an input of the image and instructions for displaying the image; and
a controller in communication with the projecting light source, the light source steering device, and the user interface, the controller configured to:
retrieve the data input from the user interface,
access image data corresponding to the image, and
control the projecting light source and the light source steering device to project the image onto a target surface within the body of water based on the data input from the user interface,
wherein the controller is configured to retrieve additional input related to the projected image on the target surface, and adjust one of the projecting light source and the light source steering device to project a corrected image onto the target surface within the body of water based on the additional input, and
wherein the controller is configured to provide a preview of the corrected image through the user interface and again retrieve the additional input to determine whether additional correction is needed.

19. The underwater image projection system of claim 18, wherein the additional input includes one of additional data input from the user interface and data from at least one sensor in communication with the controller.

20. The underwater image projection system of claim 18, wherein the projected image and the corrected image differ in at least one of color, saturation, contrast, skew adjustment, pitch adjustment, pincushioning, aliasing and anti-aliasing.

* * * * *